United States Patent
Okamoto

[19]

[11] Patent Number: 6,042,955
[45] Date of Patent: Mar. 28, 2000

[54] FUEL CELL AND METHOD OF CONTROLLING SAME

[75] Inventor: Takafumi Okamoto, Koshigaya, Japan

[73] Assignee: Honda Giken Kogyo Kabushiki Kaisha, Tokyo, Japan

[21] Appl. No.: 08/952,953

[22] PCT Filed: May 24, 1996

[86] PCT No.: PCT/JP96/01403

§ 371 Date: Mar. 6, 1998

§ 102(e) Date: Mar. 6, 1998

[87] PCT Pub. No.: WO96/37920

PCT Pub. Date: Nov. 28, 1996

[30] Foreign Application Priority Data

| May 25, 1995 | [JP] | Japan | 7-126378 |
| Jun. 13, 1995 | [JP] | Japan | 7-145884 |
| Jun. 26, 1995 | [JP] | Japan | 7-159608 |

[51] Int. Cl.[7] ............................................. H01M 8/00
[52] U.S. Cl. .................... 429/13; 429/20; 429/24; 429/25; 429/26; 429/32; 429/34; 429/35; 429/38; 429/39

[58] Field of Search .................... 429/13, 20, 24, 429/25, 26, 17, 30, 34, 41, 38, 39, 32, 35

[56] References Cited

U.S. PATENT DOCUMENTS 5,736,269 4/1998 Okamoto et al. ......................... 429/32

FOREIGN PATENT DOCUMENTS

| 5-190193 | 7/1993 | Japan . |
| 5-144451 | 11/1993 | Japan . |
| 6-231793 | 8/1994 | Japan . |

Primary Examiner—Bruce F. Bell
Attorney, Agent, or Firm—Lyon & Lyon LLP

[57] ABSTRACT

A fuel gas and oxygen containing gas are supplied downwardly through different passages into a first manifold plate 42, a first surface pressure generating plate 44, a separator body 48, a second surface pressure generating plate 46, a second manifold plate 50, a first gasket 30, a solid polymer electrolyte membrane 22, and a second gasket 32, into which cooling water is supplied upwardly. The cooling water rises upwardly in the separator body 48 to reduce a temperature distribution in a fuel cell 20.

30 Claims, 31 Drawing Sheets

FUEL CELL AND METHOD OF CONTROLLING SAME

TECHNICAL FIELD

The present invention relates to a fuel cell having a fuel cell structure including an anode electrode and a cathode electrode which sandwich an electrolyte membrane therebetween and separators which sandwich the fuel cell structure therebetween, and a method of controlling the fuel cell.

BACKGROUND ART

Solid polymer electrochemical fuel cells comprise a plurality of unit cells each comprising an electrolyte membrane in the form of an ion exchange membrane and a catalytic electrode and a porous carbon electrode which are disposed one on each side of the electrolyte membrane. Hydrogen supplied to the anode of the fuel cell is converted into hydrogen ions on the catalytic electrode, which move through the electrolyte membrane that has been humidified to an appropriate extent toward the cathode of the fuel cell which is made of porous carbon. An oxygen containing gas or air is supplied to the cathode electrode to generate water through a reaction between the hydrogen ions and the oxygen on the cathode electrode. Electrons which are generated at this time are led to an external circuit for use as electric energy as a direct current. Such a fuel cell is disclosed in Japanese laid-open patent publication No. 6-20713. In view of the fact that when the water is supplied to humidify the electrolyte membrane, the water may be collected as a drain on the surfaces of the separators depending on the conditions in which the fuel cell operates, the disclosed fuel cell has parallel grooves defined in the separators for supplying a fuel gas and an oxygen containing gas, respectively, the grooves being directed downwardly in the direction of gravity for draining the collected water in order to enable the solid polymer electrolyte membrane to generate electric energy at a sufficiently high level.

Specifically, since the operating temperature of fuel cells of the type described above is relatively low, water generated by a reaction between the fuel gas and the oxygen containing gas and also water added to the fuel gas or the oxygen containing gas to humidify the electrolyte membrane tend to be condensed in the gas passages in the separators, closing the gas passages thereby to lower the performance of the fuel cells.

As shown in FIG. 31 of the accompanying drawings, if a fuel cell 4 has a number of fuel cell cells 2 stacked along the direction of gravity, then water droplets are collected in regions (e.g., regions 6a or 6b) where the flow of a fuel gas or an oxygen containing gas that has been humidified, greatly lowering the performance of those fuel cells 2 which are positioned adjacent to the fuel cells 2 including the regions 6a or 6b as compared to the other fuel cells 2.

In the other fuel cells 2, since the fuel gas and the oxygen containing gas flow in directions perpendicular to the direction of gravity, condensed water is liable to be collected in portions of the fuel cells 2, so that voltages generated by the fuel cells 2 will vary from each other. Furthermore, because the water in the gas passages is temporarily discharged, it is not possible to prevent voltages generated by the fuel cells 2 from varying from each other.

The fuel cell disclosed in Japanese laid-open patent publication No. 6-20713 has such a structure that the fuel gas and the oxygen containing gas flow in directions perpendicular to the direction of gravity along the solid polymer electrolyte membrane, the anode electrode, and the cathode electrode, and cooling water flows perpendicularly to the fuel gas and the oxygen containing gas flow. While this structure is effective to alleviate shortcomings caused by unstable voltages that possibly occur due to generation and elimination of condensed water, it has been confirmed with the disclosed structure that the current density is temporarily increased owing to a temperature rise at the outlets of the fuel cells.

More specifically, it has been confirmed that, as shown in FIG. 32 of the accompanying drawings, when a fuel gas such as a hydrogen containing gas and an oxygen containing gas such as an oxide gas flow in a direction perpendicular to the direction of a cooling water flow with respect to a solid polymer electrolyte membrane 12 that is sandwiched between an anode electrode 8 and a cathode electrode 10, the temperature of the fuel cell 2 is higher downstream than upstream with respect to the gas flows. Particularly, the temperature is higher at the outlet of the cooling water flow than at the inlet of the cooling water flow.

The same phenomenon is observed when the fuel gas and the oxygen containing gas flow parallel to the direction of the cooling water flow with respect to the solid polymer electrolyte membrane 12 as disclosed in Japanese laid-open patent publication No. 5-144451, for example. This is shown in FIG. 33 of the accompanying drawings. In the arrangement shown in FIG. 33, the temperature of a lower portion of the fuel cell 2 is higher than temperature of an upper portion thereof. The phenomenon indicates that the heat generated by a heating reaction is subjected to a heat exchange with the gases and the heat caused by a contact resistance, etc. is subjected to a heat exchange with the gases on the cathode electrode 10 and the anode electrode 8, causing the temperature of the gases to rise progressively toward the outlet of the fuel cell 2, with the gases heating the electrodes themselves. As a result, each fuel cell 2 suffers a temperature distribution between upstream and downstream portions of the gases, with the result that the voltage generated by the fuel cell 2 suffers a distribution. Accordingly, the output voltage produced by the fuel cell 2 is not stable, shortening the service life of the fuel cell 2 itself. If the fuel cell 4 comprising fuel cells 2 each having a temperature distribution is used as a power source for motor vehicles, then a complex control process will be required to control the running of the motor vehicle.

There is known a fuel cell comprising a first unit cell, a fuel gas supply means, a cooling plate, an oxygen containing gas supply means, and a second unit cell that are successively stacked in order to remove heat produced upon generation of electric energy, as disclosed in Japanese laid-open patent publication No. 5-190193. In the disclosed fuel cell, the cooling plate has cooling water passages defined therein, and the first and second unit cells are cooled by the fuel gas supply means and the oxygen containing gas supply means. The cooling efficiency of the surface of the cooling plate which is held against the fuel gas supply means is higher than the cooling efficiency of the surface of the cooling plate which is held against the oxygen containing gas supply means.

According to the above prior art, the cooling efficiencies of the anode and cathode electrodes are set to optimum levels by positioning the cooling water passages of the cooling plate closely to the fuel gas supply means, or providing individual cooling water passages respectively in the fuel gas supply means and the oxygen containing gas supply means, or using cooling members having different thermal conductivities respectively with respect to the fuel gas supply means and the oxygen containing gas supply means, or making a fuel gas passage member thinner than an oxygen containing gas passage member.

With the above prior art, the fuel gas supply means, the cooling plate, and the oxygen containing gas supply means are disposed as a separator interposed between the first and second unit cells. Consequently, the separator is made up of many components, has a large thickness, and does not make the fuel cell compact as a whole. Another problem is that the fuel cell is heavy in its entirety because the separator is made up of many components.

It has been proposed to use a porous material as a separator for directly humidifying a fuel gas and a solid polymer electrolyte membrane in order to keep the solid polymer electrolyte membrane and an ionic conduction component in a constantly wet state at all times (see Japanese laid-open patent publication No. 6-231793).

The presence of a contact resistance in a fuel cell structure increases an internal ohmic loss, thereby lowering a voltage between its terminals. It is necessary to impart desired tightening forces to the fuel cell structure for the purpose of reducing the contact resistance.

The above separator, however, fails to impart tightening forces directly to the fuel cell structure for structural reasons, and hence the fuel cell needs to have a structure dedicated to produce tightening forces. As a consequence, the fuel cell is constructed of an increased number of parts, large in size, and heavy in weight.

It is an object of the present invention to provide a method of controlling a fuel cell which comprises a number of fuel cells each employing an electrolyte membrane, stabilizes the output voltage of each of the fuel cells, increases the service life of the fuel cells, and is simple in structure and inexpensive to manufacture.

Another object of the present invention is to provide a fuel cell which has anode and cathode electrodes that can be set to optimum cooling efficiencies, respectively, is made up parts that are not increased in number, can be made compact and light.

Still another object of the present invention is to provide a fuel cell which is simple in structure and can uniformize the temperature of an electric generation section easily and accurately.

Yet still another object of the present invention is to provide a fuel cell whose electrolyte membrane can directly be humidified, to which desired tightening forces can be imparted, which is simple in structure, and which has many functions.

DISCLOSURE OF THE INVENTION

According to the present invention, a fuel gas and an oxygen containing gas are introduced in the direction of gravity into each of fuel cells, and a cooling medium such as cooling water is introduced in an opposite direction, i.e., against gravity, into separators in the fuel cell. Therefore, the heat generated in a lower portion of the fuel cell is reduced by the cooling medium while its cooling capability is high, for thereby minimizing a temperature distribution in the fuel cell between its upper and lower portions. As a result, the output voltage of each of the fuel cells is stabilized. The minimized temperature distribution is effective to increase the service life of the fuel cell.

The separator has an anode-side element member held against an anode electrode and a cathode-side element member held against a cathode electrode, with a cooling medium passage defined directly between the anode-side element member and the cathode-side element member. Therefore, the number of components of the separator is reduced. The anode-side element member and the cathode-side element member have increased contact area regions on respective surfaces which define the cooling medium passage. Optimum cooling efficiencies for the anode and cathode electrodes can be established simply by changing the shape, etc. of the increased contact area regions.

Temperature regulating medium passages are defined in a first gas passage for supplying an oxygen containing gas and/or a second gas passage for supplying a fuel gas by a partition, the temperature regulating medium passages being identical in structure to the first gas passage and the second gas passage. The oxygen containing gas and/or the fuel gas flows in a direction opposite to the direction in which a temperature regulating medium flows in the temperature regulating medium passages. Therefore, the oxygen containing gas flowing through the first gas passage and a cooling medium flowing through the temperature regulating medium passages flow in opposite directions to each other, so that the efficiency of heat exchange between the oxygen containing gas and the cooling medium is increased for uniformizing the temperature of an electric generation section. Similarly, the temperature of the electric generation section can be uniformized by the fuel gas flowing through the second gas passage and the cooling medium flowing through the temperature regulating medium passages.

Furthermore, first and second cooling mediums are provided independently in the separator, and desired first and second cooling mediums depending on the anode and cathode electrodes can selectively be introduced into the first and second cooling passages. Consequently, water may be used as the first cooling medium to directly humidify the anode electrode and the fuel gas, and the second cooling medium may be used to apply tightening forces to the cathode electrode. It is also possible to establish cooling efficiencies optimum for the anode and cathode electrodes.

BEST MODE FOR CARRYING OUT THE INVENTION

Figure 1:
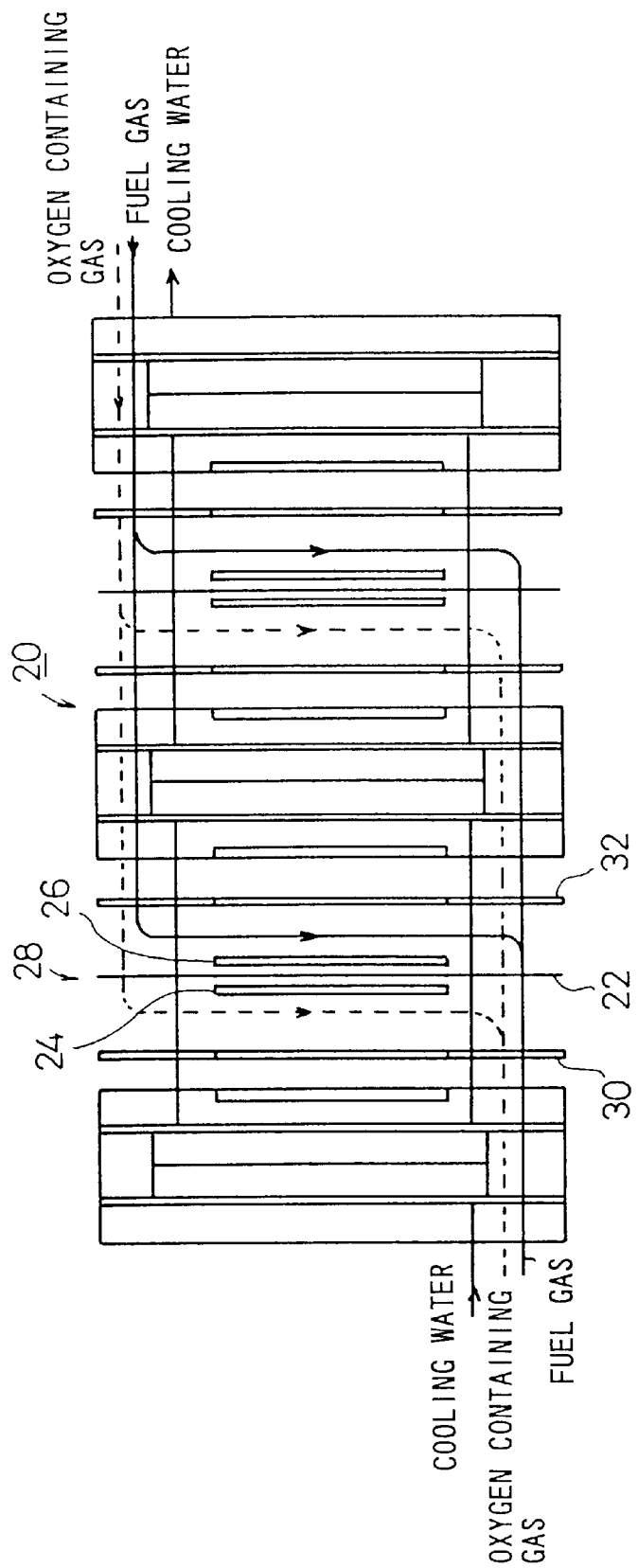
FIG. 1 is a schematic view illustrative of the principles of a method according to the present invention.
Figure 2:
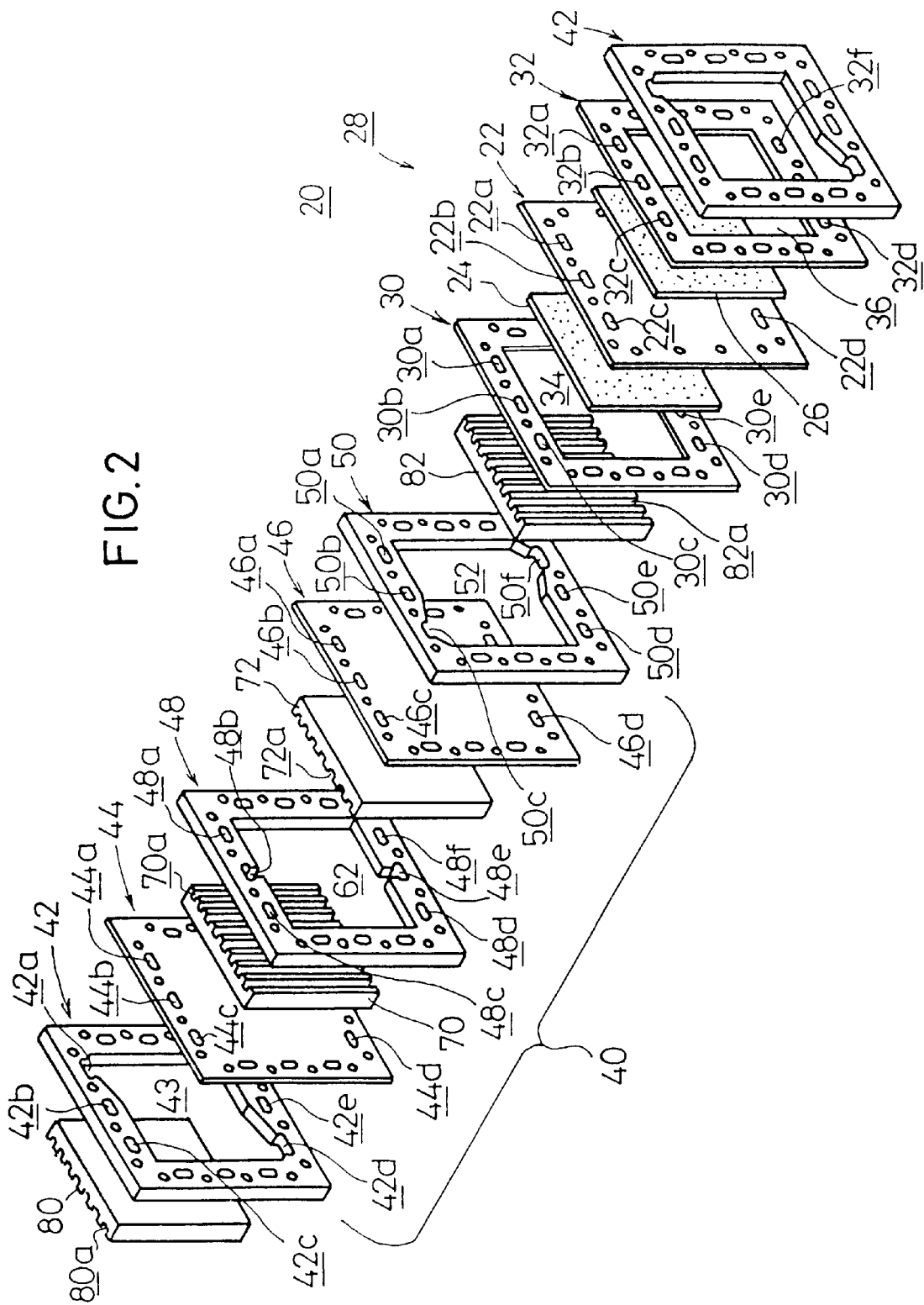
FIG. 2 is an exploded perspective view of a fuel cell according to a first embodiment of the present invention, with respect to which a method according to the present invention is carried out.

As shown in FIGS. 1 and 2, a fuel cell according to a first embodiment of the present invention basically comprises a horizontal stack of fuel cells 20. Each of the fuel cells 20 includes a fuel cell structure 28 having an anode electrode 26 and a cathode electrode 24 which sandwich a solid polymer electrolyte membrane 22 therebetween. The fuel cell structure 28 is described in detail in International laid-open publication WO94-15377, which is incorporated herein by reference. In FIG. 1, the solid polymer electrolyte membrane 22, the anode electrode 26, and the cathode electrode 24 are separate from each other. However, they may be of an integral structure.

Figure 3:
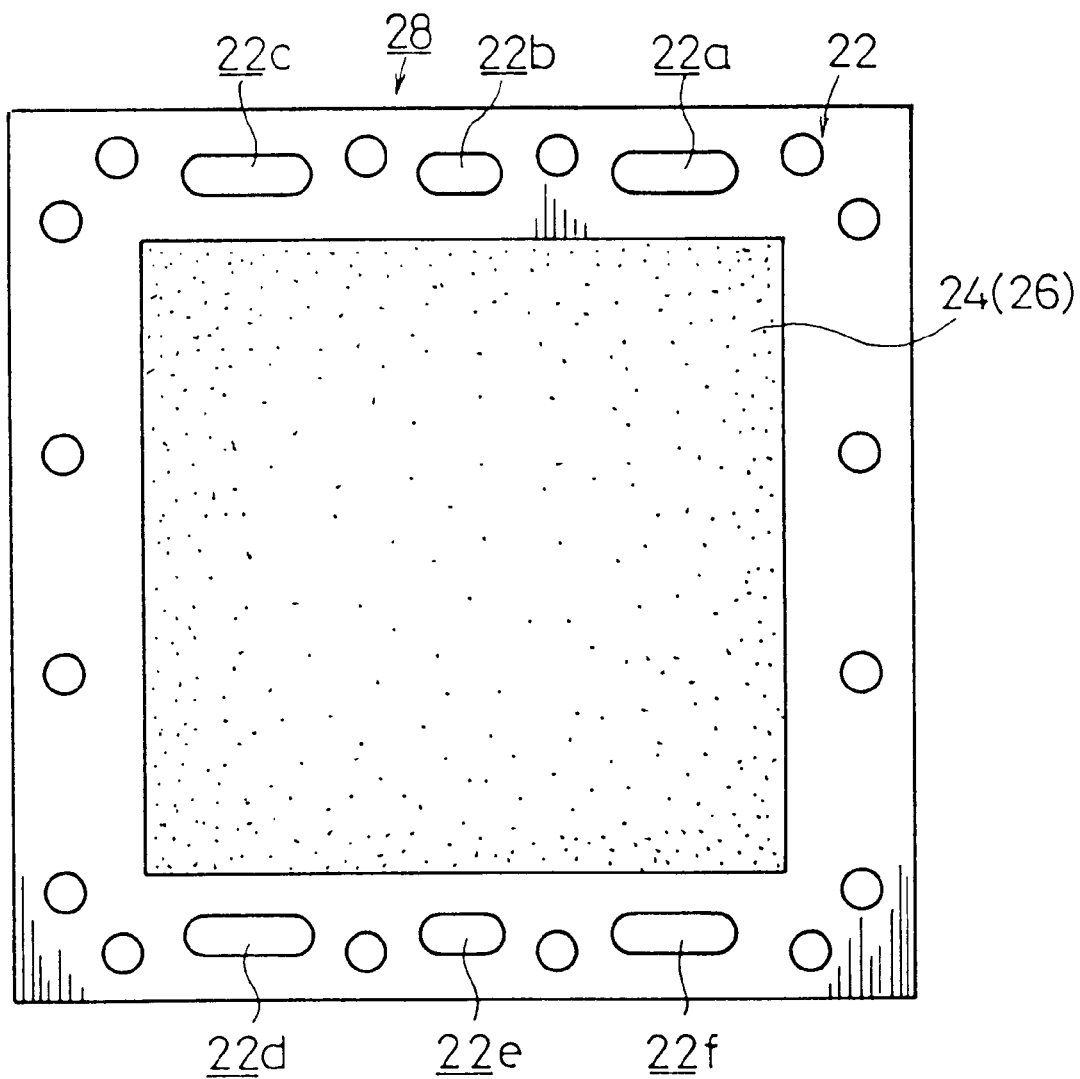
FIG. 3 is a front elevational view showing a bonded state of a solid polymer electrolyte membrane and an electrode of the fuel cell according to the first embodiment.

As shown in FIG. 3, the solid polymer electrolyte membrane 22 has an oblong hole 22a for passing a fuel gas such as a hydrogen containing gas or the like in one direction, a hole 22b for passing cooling water, and a hole 22c for passing an oxygen containing gas, the holes 22a, 22b, 22c being defined in an upper portion of the solid polymer electrolyte membrane 22. The solid polymer electrolyte membrane 22 also has a hole 22d for passing the fuel gas, a hole 22e for passing the cooling water, and a hole 22f for passing the oxygen containing gas, the holes 22d, 22e, 22f being defined in a lower portion of the solid polymer electrolyte membrane 22.

Figure 4:
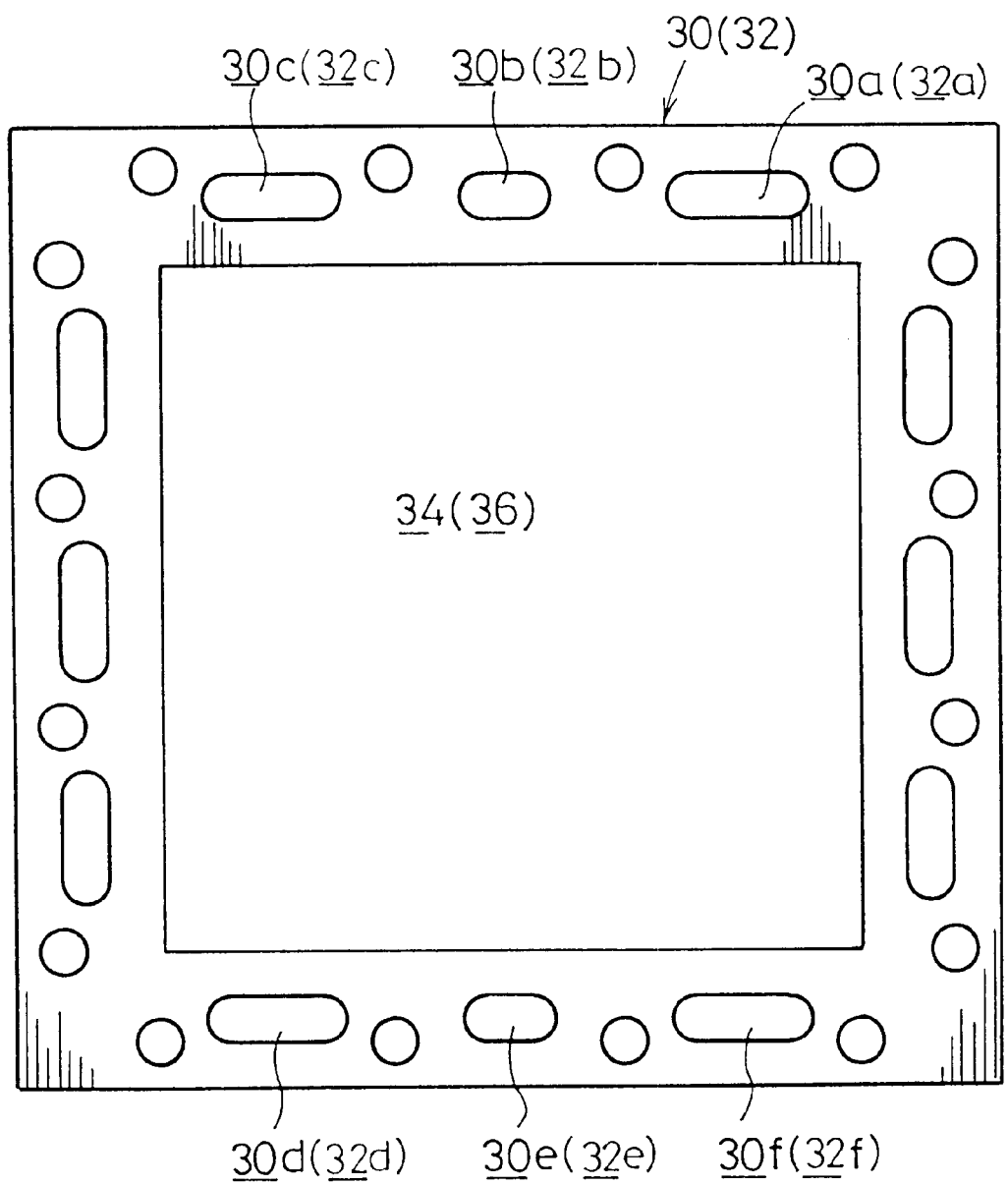
FIG. 4 is a front elevational view of a gasket of the fuel cell according to the first embodiment.

A first gasket 30 and a second gasket 32 are disposed one on each side of the fuel cell structure 28. The first gasket 30 has a large opening 34 for accommodating the cathode electrode 24 therein, and the second gasket 32 has an opening 36 for accommodating the anode electrode 26. The first gasket 30 and the second gasket 32 have holes 30a, 30d and holes 32a, 32d, respectively, for passing the fuel gas, holes 30b, 30e and holes 32b, 32e, respectively, for passing the cooling water, and holes 30c, 30f and holes 32c, 32f, respectively, for passing the oxygen containing gas, these holes being defined respectively in upper and lower end portions of the first gasket 30 and the second gasket 32 (see FIG. 4). Oblong holes defined in sides of the first and second gaskets 30, 32 serve to reduce the weight thereof.

A separator 40 against which the first gasket 30 and the second gasket 32 are held and which has a hole for accommodating the anode electrode 26 and the cathode electrode 24 will be described below.

The separator 40 basically comprises a first manifold plate 42, a first surface pressure generating plate 44 held against the first manifold plate 42, a second surface pressure generating plate 46, a separator body 48 sandwiched between the first surface pressure generating plate 44 and the second surface pressure generating plate 46, a second manifold plate 50 held against the second surface pressure generating plate 46.

Figure 5:
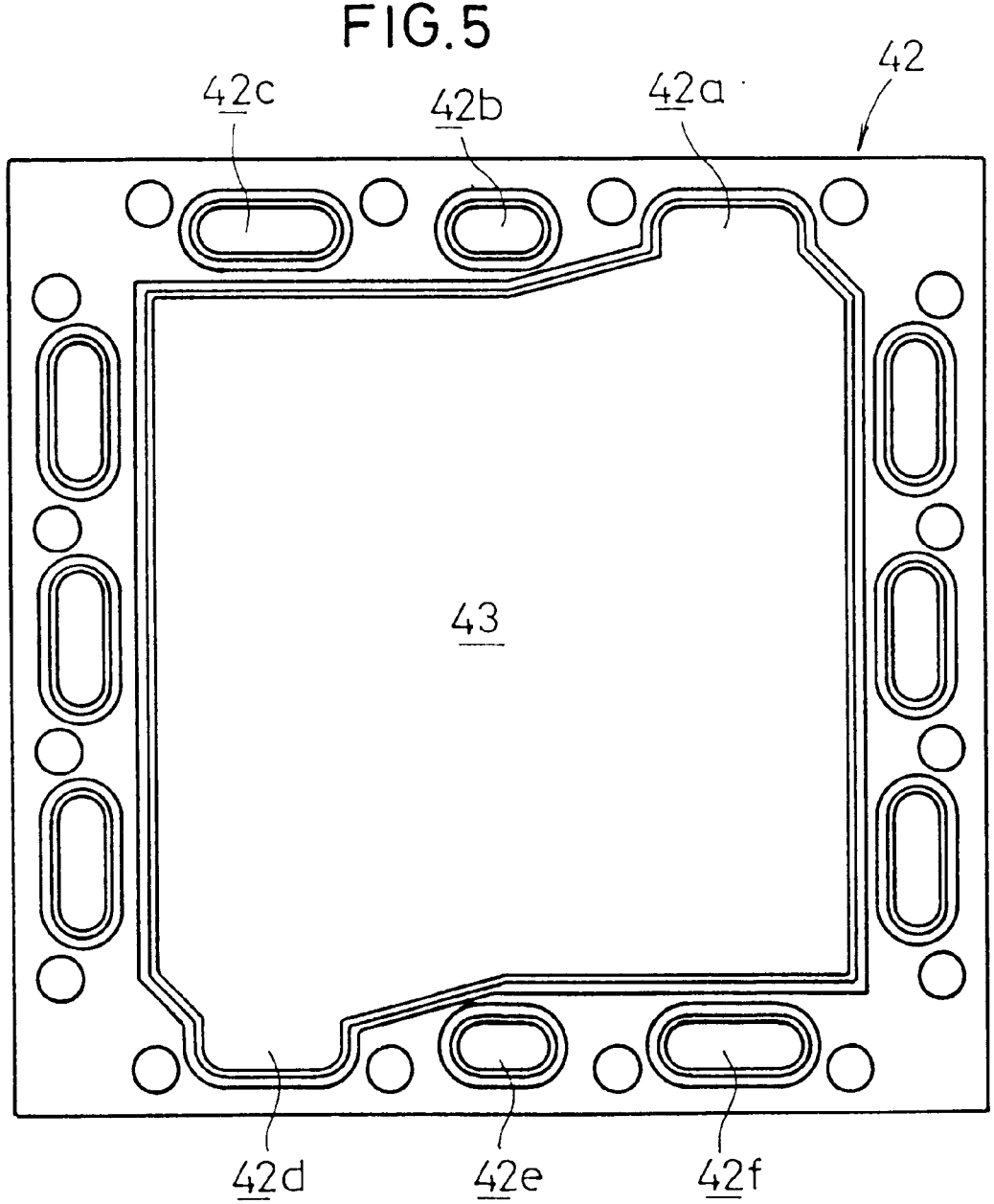
FIG. 5 is a front elevational view of a first manifold plate of the fuel cell according to the first embodiment.

As shown in FIG. 5, the first manifold plate 42 comprises a rectangular flat plate, and has a fuel gas supply recess 42a defined in an upper right corner thereof for supplying the fuel gas and a cooling water discharge hole 42b defined therein adjacent to the fuel gas supply recess 42a for discharging the cooling water. The first manifold plate 42 also has an oxygen containing gas supply hole 42c defined in an upper left corner thereof for supplying the oxygen containing gas. The first manifold plate 42 further has a fuel gas discharge recess 42d defined in a lower left corner thereof for discharging the fuel gas, and a cooling water supply hole 42e defined therein adjacent to the fuel gas discharge recess 42d for supplying the cooling water. The first manifold plate 42 also has an oxygen containing gas discharge hole 42f defined in a lower right corner thereof for discharging the oxygen containing gas. The fuel gas supply recess 42a and the fuel gas discharge recess 42d are held in communication with each other through an opening 43. Oblong holes defined in opposite sides of the first manifold plate 42 and extending vertically serve to reduce the weight of the first manifold plate 42. Circular holes defined in the first manifold plate 42 serve to insert studs or the like therethrough when it is stacked.

Figure 6:
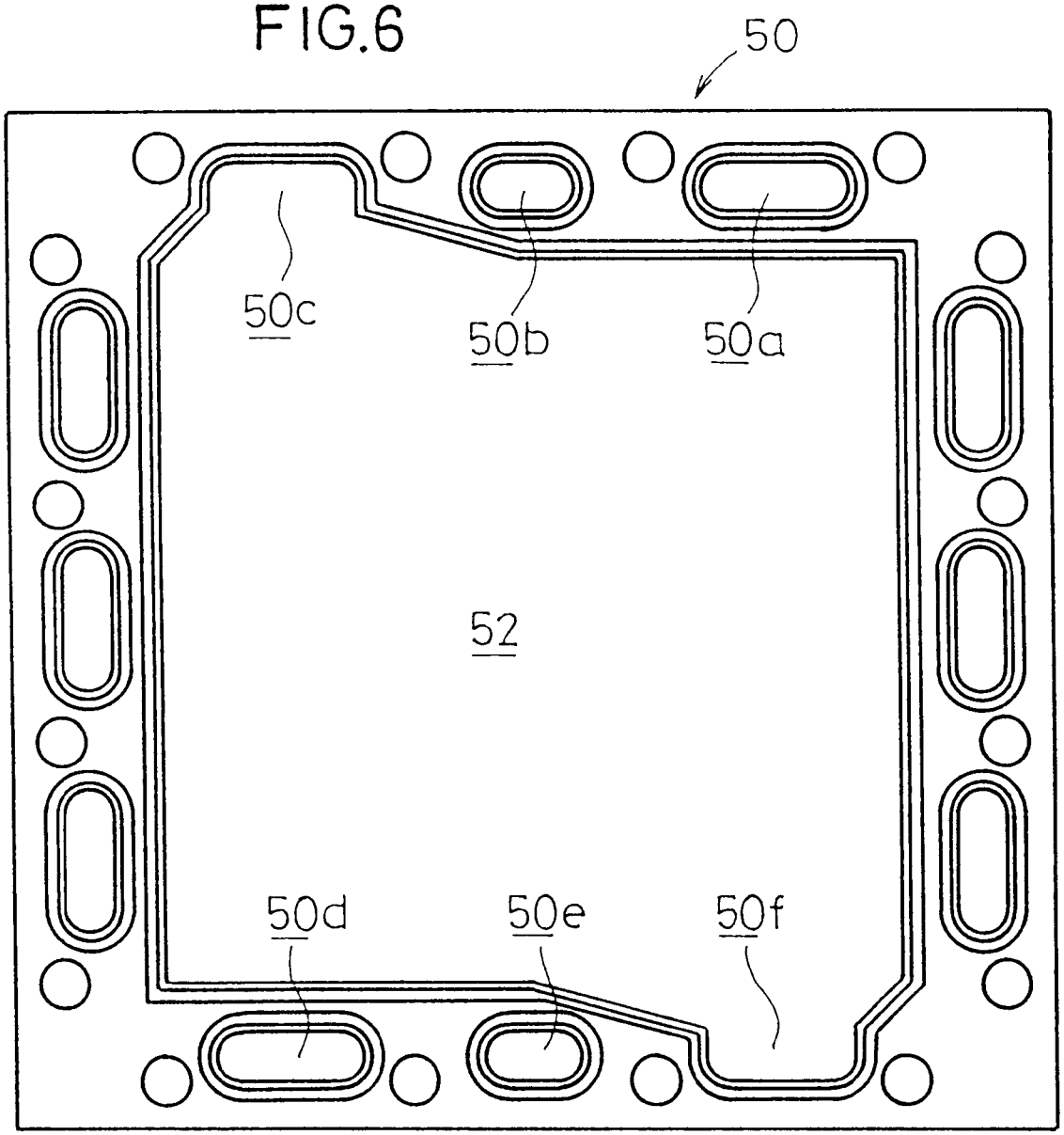
FIG. 6 is a front elevational view of a second manifold plate of the fuel cell according to the first embodiment.

As shown in FIG. 6, the first manifold plate 42 and the second manifold plate 50 are basically of a symmetrical structure. Therefore, details of the second manifold plate 50 will not be described below. The second manifold plate 50 has a fuel gas supply hole 50a, a cooling water discharge hole 50b, an oxygen containing gas supply recess 50c, a fuel gas discharge hole 50d, a cooling water supply hole 50e, and an oxygen containing gas discharge recess 50f. The oxygen containing gas supply recess 50c and the oxygen containing gas discharge recess 50f are held in communication with each other through an opening 52.

Figure 7:
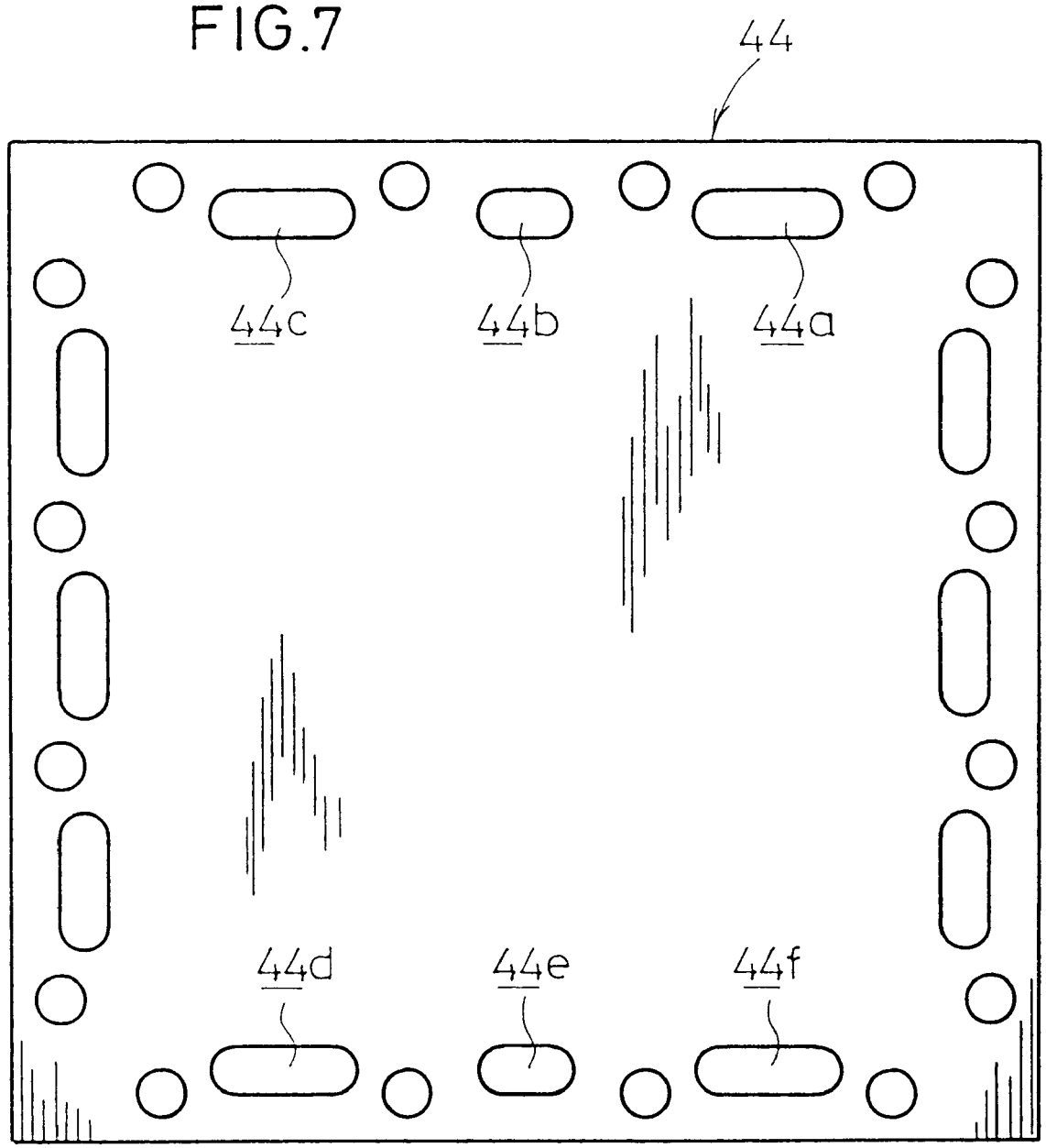
FIG. 7 is a front elevational view of a surface pressure generating plate of the fuel cell according to the first embodiment.

The first surface pressure generating plate 44 held against the first manifold plate 42 will be described below with reference to FIG. 7. The second surface pressure generating plate 46 is substantially identical to the first surface pressure generating plate 44 and hence will not be described in detail below.

The first surface pressure generating plate 44 comprises a flat plate made of an electrically conductive material such as carbon, metal, or the like. The first surface pressure generating plate 44 has a fuel gas supply communication hole 44a defined in an upper right corner thereof and held in communication with the fuel gas supply recess 42a in the first manifold plate 42 and a cooling water discharge communication hole 44b defined therein adjacent to the fuel gas supply communication hole 44a. The first surface pressure generating plate 44 also has an oxygen containing gas supply communication hole 44a defined in an upper left corner thereof and held in communication with the oxygen containing gas supply hole 42c. The first surface pressure generating plate 44 further has a fuel gas discharge communication hole 44d defined in a lower left corner thereof and held in communication with the fuel gas discharge recess 42d in the first manifold plate 42 and a cooling water supply communication hole 44e defined therein adjacent to the fuel gas discharge communication hole 44d. The first surface pressure generating plate 44 also has an oxygen containing gas discharge communication hole 44f defined in a lower right corner thereof and held in communication with the oxygen containing gas discharge hole 42f. Remaining oblong holes defined in the first surface pressure generating plate 44 serve to reduce the weight thereof, and circular holes defined in the first surface pressure generating plate 44 serve to insert studs or the like therethrough when the fuel cells 20 are stacked and tightened.

Figure 8:
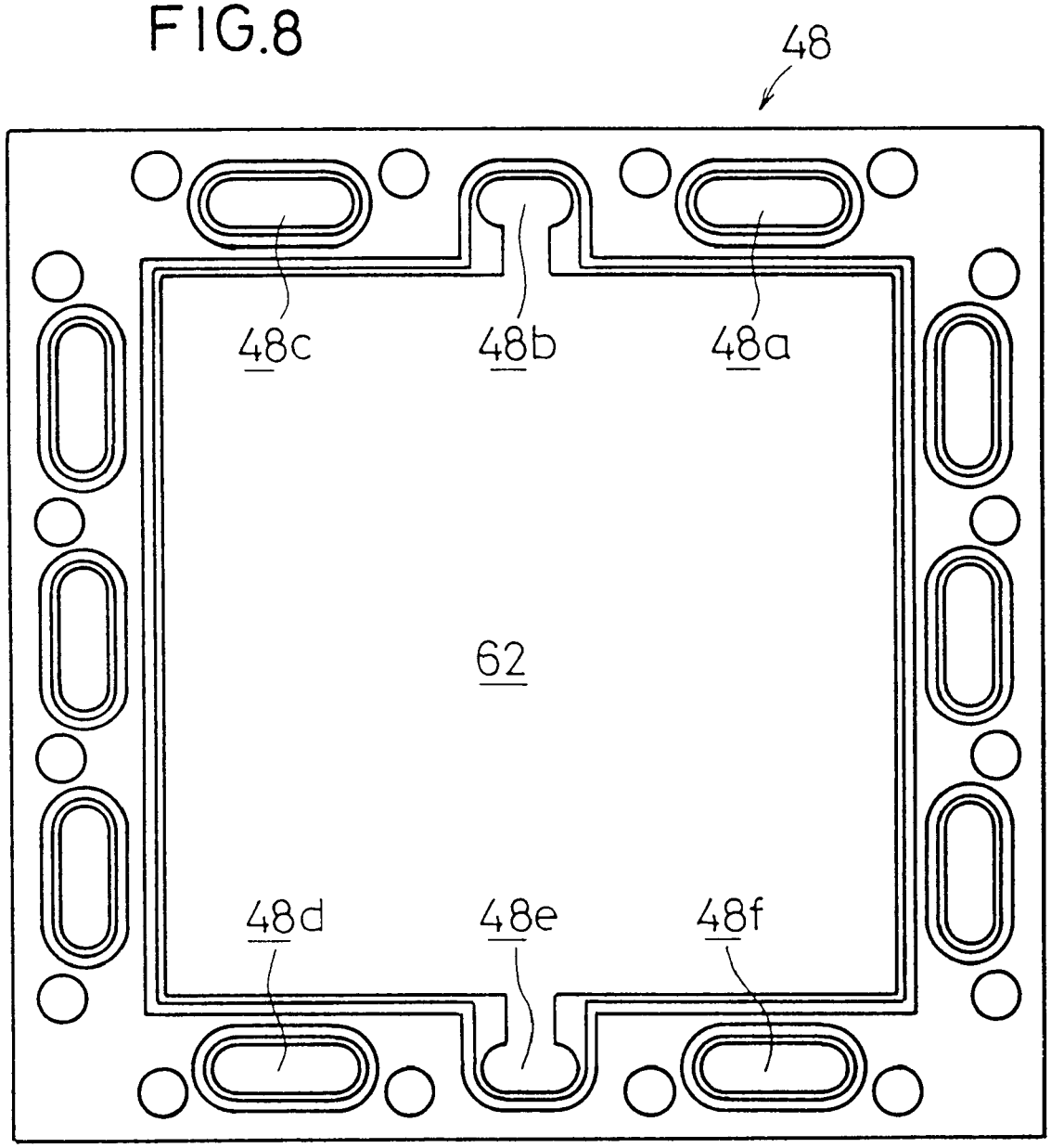
FIG. 8 is a front elevational view of a separator body of the fuel cell according to the first embodiment.

FIG. 8 shows a third manifold plate, i.e., the separator body 48. The separator body 48 serves to supply the cooling water to cool the fuel cell structure 28. The separator body 48, which is relatively thick, is made of an electrically conductive material such as carbon, metal, or the like. The separator body 48 has a fuel gas supply hole 48a defined in an upper right corner thereof and held in communication with the recess 42a and the communication hole 44a. The separator body 48 also has a cooling water discharge recess 48b defined in a substantially central upper portion thereof adjacent to the fuel gas supply hole 48a and held in communication with the cooling water discharge hole 42b and the communication hole 44b. The separator body 48 further has an oxygen containing gas supply hole 48c defined in an upper left corner thereof and held in communication with the oxygen containing gas supply hole 42c and the communication hole 44c. The separator body 48 also has a hole 48d defined in a lower left corner thereof and held in communication with the fuel gas discharge recess 42d and the communication hole 44d, a cooling water supply recess 48e directly below the cooling water discharge recess 48b in FIG. 8, and an oxygen containing gas discharge hole 48f defined in a lower right corner thereof. The recesses 48b, 48e communicate with each other through a large opening 62.

Cooling water flow rectifying plates 70, 72 are fitted and fixed in the opening 62 in the separator body 48. The combined thickness of the cooling water flow rectifying plates 70, 72 is essentially the same as the thickness of the separator body 48. The cooling water flow rectifying plate 70 has a plurality of parallel grooves 70a extending vertically in FIG. 2. Likewise, the cooling water flow rectifying plate 72 has a plurality of parallel grooves 72a. When the cooling water flow rectifying plates 70, 72 are combined with each other, the grooves 70a, 72a jointly define large cooling water flow rectifying passages which are held in communication with the recesses 48b, 48e.

Figure 9:
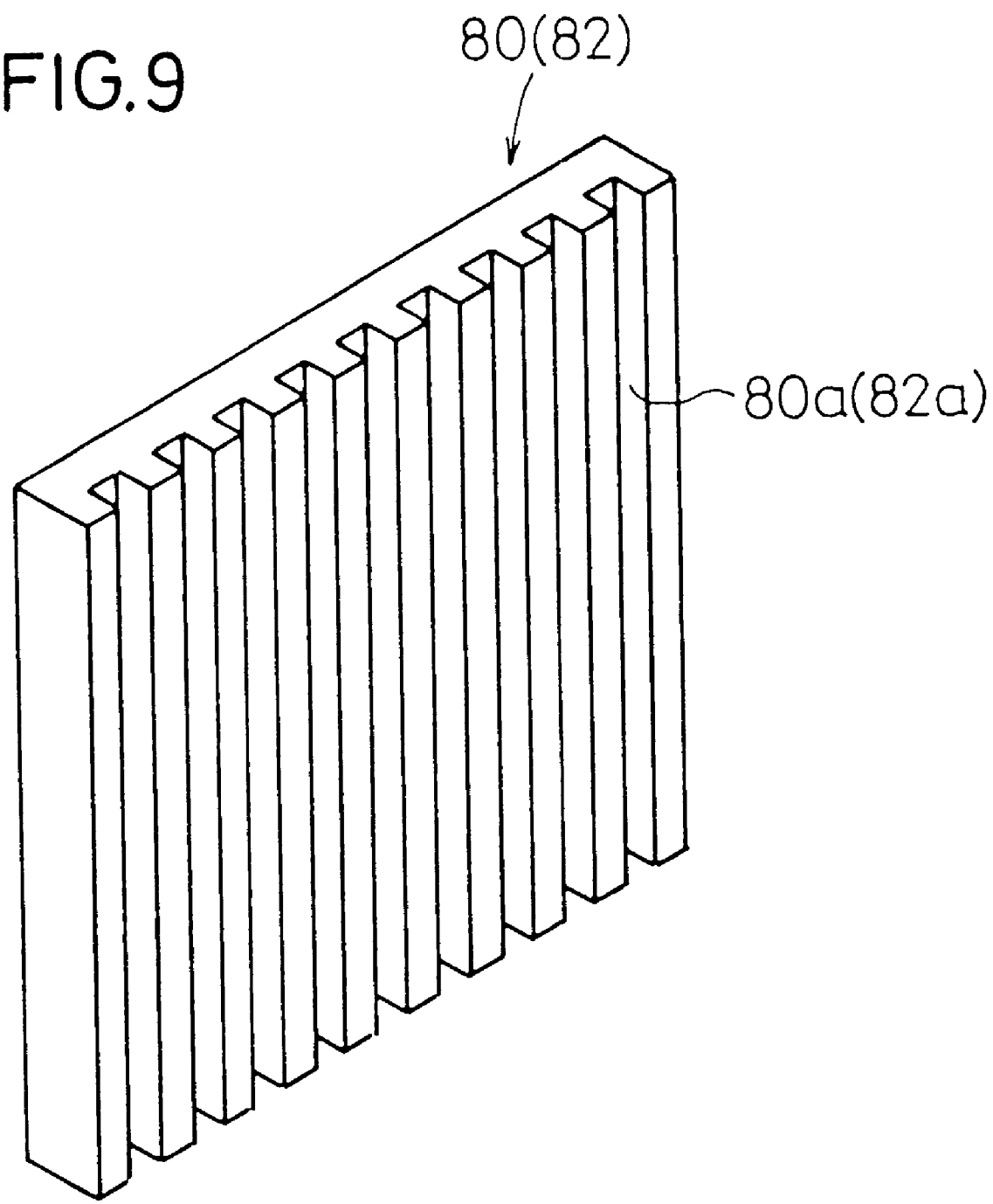
FIG. 9 is a perspective view of a flow rectifying plate incorporated in the first and second manifold plates of the fuel cell according to the first embodiment.

As can be seen from FIGS. 1, 2, and 9, a fuel gas flow rectifying plate 80 is fitted in the opening 43 in the first manifold plate 42. The fuel gas flow rectifying plate 80 has a flat surface and an opposite surface having a plurality of parallel grooves 80a defined therein and extending vertically. The parallel grooves 80a provide communication between the fuel gas supply recess 42a and the fuel gas discharge recess 42d. An oxygen containing gas flow rectifying plate 82 is fitted in the opening 52 in the second manifold plate 50. The oxygen containing gas flow rectifying plate 82 has a flat surface and an opposite surface having a plurality of parallel grooves 82a defined therein and extending vertically. The parallel grooves 82a provide communication between the oxygen containing gas supply recess 50c and the oxygen containing gas discharge recess 50f. The first manifold plate 42, the fuel gas flow rectifying plate 80, the second manifold plate 50, and the oxygen containing gas flow rectifying plate 82 have essentially the same thickness.

The separator body 48 thus constructed is sandwiched by the first surface pressure generating plate 44 and the second surface pressure generating plate 46, which are in turn sandwiched by the first manifold plate 42 and the second manifold plate 50. The second gasket 32 is held against the first manifold plate 42, and the first gasket 30 is held against the second manifold plate 50, with the fuel cell structure 28 sandwiched between the gaskets 30, 32, thus making up the fuel cell 20. The fuel gas supply hole 22a in the solid polymer electrolyte membrane 22, the hole 30a in the first gasket 30, the hole 32a in the second gasket 32, the recess 42a in the first manifold plate 42, the hole 48a in the separator body 48, and the hole 50a in the second manifold plate 50 are kept in communication with each other, and the fuel gas discharge hole, the cooling water discharge hole, the cooling water supply hole, the oxygen containing gas supply hole, and the oxygen containing gas discharge hole are also kept in communication with each other.

The fuel cell according to the first embodiment, which is controlled by a control method according to the present invention is constructed as described above. Operation of the fuel cell will now be described below.

Basically, the fuel cells 20 are stacked together into the fuel cell. According to the first embodiment, the stacked fuel cells 20 extend horizontally. For starting to activate the fuel cell, a hydrogen containing gas, preferably, passes as a fuel gas through the recess 42a in the first manifold plate 42, the communication hole 44a in the first surface pressure generating plate 44, the hole 48a in the separator body 48, the communication hole 46a in the second surface pressure generating plate 46, the hole 50a in the second manifold plate 50, the hole 30a in the first gasket 30, the hole 22a in the solid polymer electrolyte membrane 22, the hole 32a in the second gasket 32, and the recess 42a in the next first manifold plate 42.

At this time, in the first manifold plate 42, the fuel gas passes from the recess 42a through the grooves 80a in the flow rectifying plate 80 into the recess 42d, during which time the fuel gas flowing through the grooves 80a in the flow rectifying plate 80 reaches the anode electrode 26. The unreacted gas in the recess 42d passes through the recess 42d in the first manifold plate 42, the communication hole 44d in the first surface pressure generating plate 44, the hole 48d in the separator body 48, the communication hole 46d in the second surface pressure generating plate 46, the hole 50d in the second manifold plate 50, the hole 30d in the first gasket 30, the hole 22d in the solid polymer electrolyte membrane 22, the hole 32d in the second gasket 32, and the recess 42d in the next first manifold plate 42.

An oxygen containing gas passes through the recess 42c in the first manifold plate 42, the communication hole 44c in the first surface pressure generating plate 44, the hole 48c in the separator body 48, the communication hole 46c in the second surface pressure generating plate 46, the hole 50c in the second manifold plate 50, the hole 30c in the first gasket 30, the hole 22c in the solid polymer electrolyte membrane 22, the hole 32c in the second gasket 32, and the recess 42c in the next first manifold plate 42.

At this time, in the second manifold plate 50, the oxygen containing gas passes from the recess 50c through the grooves 82a in the flow rectifying plate 82 into the recess 50f, during which time the oxygen containing gas flowing through the grooves 82a in the flow rectifying plate 82 reaches the cathode electrode 24. The oxygen containing gas in the recess 50f passes through the recess 42f in the first manifold plate 42, the communication hole 44f in the first surface pressure generating plate 44, the hole 48f in the separator body 48, the communication hole 46f in the second surface pressure generating plate 46, the hole 50f in the second manifold plate 50, the hole 30f in the first gasket 30, the hole 22f in the solid polymer electrolyte membrane 22, the hole 32f in the second gasket 32, and the recess 42f in the next first manifold plate 42.

Cooling water is supplied in a direction opposite to the fuel gas and the oxygen containing gas. Specifically, the cooling gas having passed through the hole 42e in the first manifold plate 42 passes through the hole 32e in the second gasket 32, the hole 22e in the solid polymer electrolyte membrane 22, the hole 30e in the first gasket 30, the hole 50e in the second manifold plate 50, the communication hole 44e in the second surface pressure plate 46, the recess 48e in the separator body 48, the communication hole 44e in the first surface pressure plate 44, and the hole 42e in the first manifold plate 42. During this time, the cooling water which passes upwardly through the cooling water flow rectifying passage defined between the flow rectifying plates 70, 72 joined to each other reaches the recess 48b in the separator body 48. The cooling thus flowing upwardly into the recess 48b flows through the communication hole 44b in the first surface pressure plate 44, the hole 42b in the first manifold plate 42, the hole 32b in the second gasket 32, the hole 22b in the solid polymer electrolyte membrane 22, the hole 30b in the first gasket 30, the hole 50b in the second manifold plate 50, and the communication hole 46b in the second surface pressure plate 46.

Figure 10:
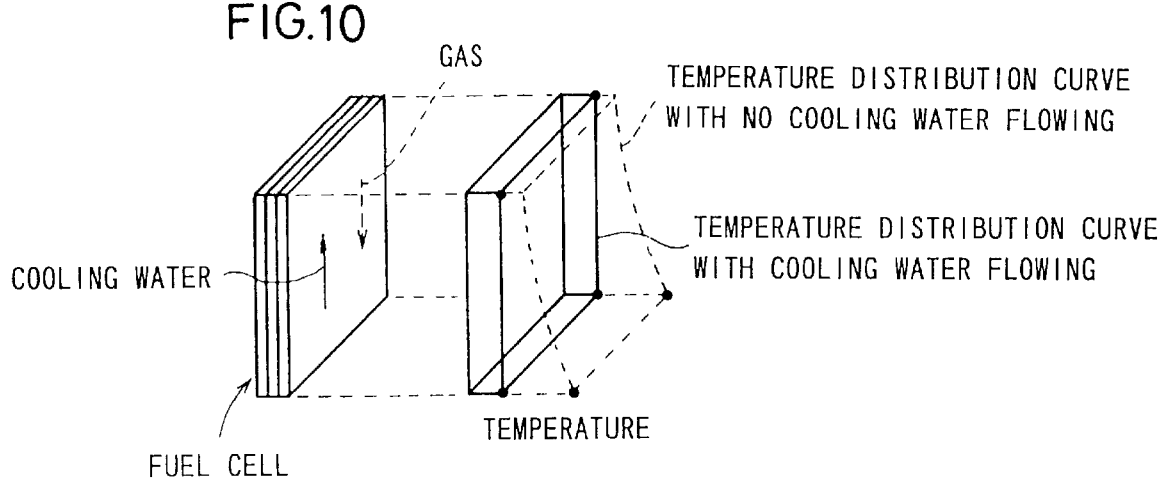
FIG. 10 is a diagram illustrating that the fuel cell according to the first embodiment is free of a temperature distribution.

According to the first embodiment, therefore, the fuel gas and the oxygen containing gas flow downwardly along the direction of gravity, whereas the cooling water flows upwardly in the separator body 48. Consequently, as shown in FIG. 10, based on the principles that the cooling water at the lowest temperature cools a region of the fuel cell 20 at the highest temperature, the cooling water forcibly cools the lower portion of the electrolyte membrane 22 where the temperature gradient is high, with a sufficiently high cooling capability that is achieved when the cooling water is introduced into the separator body 48. Thus, the fuel cell 20 is operated free of a temperature distribution as a whole. As a result, the overall temperature in the cell plane decreases, removing the heat in the vicinity of the outlet of the cooling water compared with the inlet thereof, so that the temperature of the cell is lowered. The cooling water warmed by the heat in the vicinity of the gas outlet increases the temperature of the fuel cell 20 in the vicinity of the gas inlet, substantially reducing the temperature difference in the fuel cell 20 between the gas inlet and the gas outlet. Therefore, it is possible for the fuel cell 20 to operate with a reduced temperature distribution.

Figure 11:
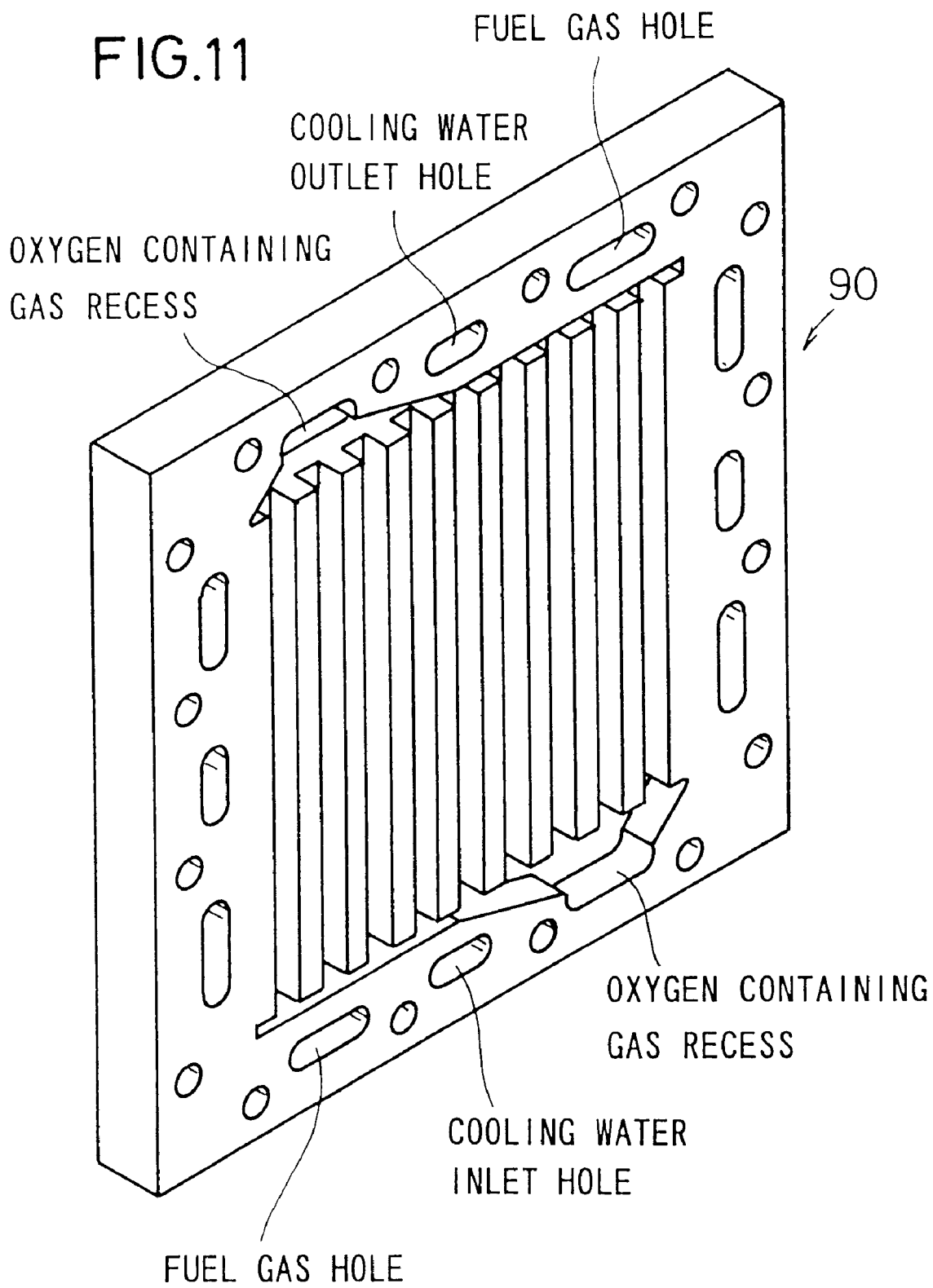
FIG. 11 is a perspective view of an integral structure of a manifold plate and a flow rectifying plate of a fuel cell according to a second embodiment of the present invention.

FIG. 11 shows a second embodiment of the present invention with respect to which the method according to the present invention is carried out. In the first embodiment, the first manifold plate 42 and the flow rectifying plate 80 are separate from each other, and similarly the second manifold plate 50 and the flow rectifying plate 82 are separate from each other. According to the second embodiment, however, the first manifold plate 42 and the flow rectifying plate 80 are integral with each other, and the second manifold plate 50 and the flow rectifying plate 82 are integral with each other, thus making up a manifold plate 90 with a flow rectifying mechanism. Therefore, the fuel cell according to the second embodiment can be manufactured easily and made up of a reduced number of parts.

A fuel cell according to a third embodiment of the present invention will be described below.

Figure 12:
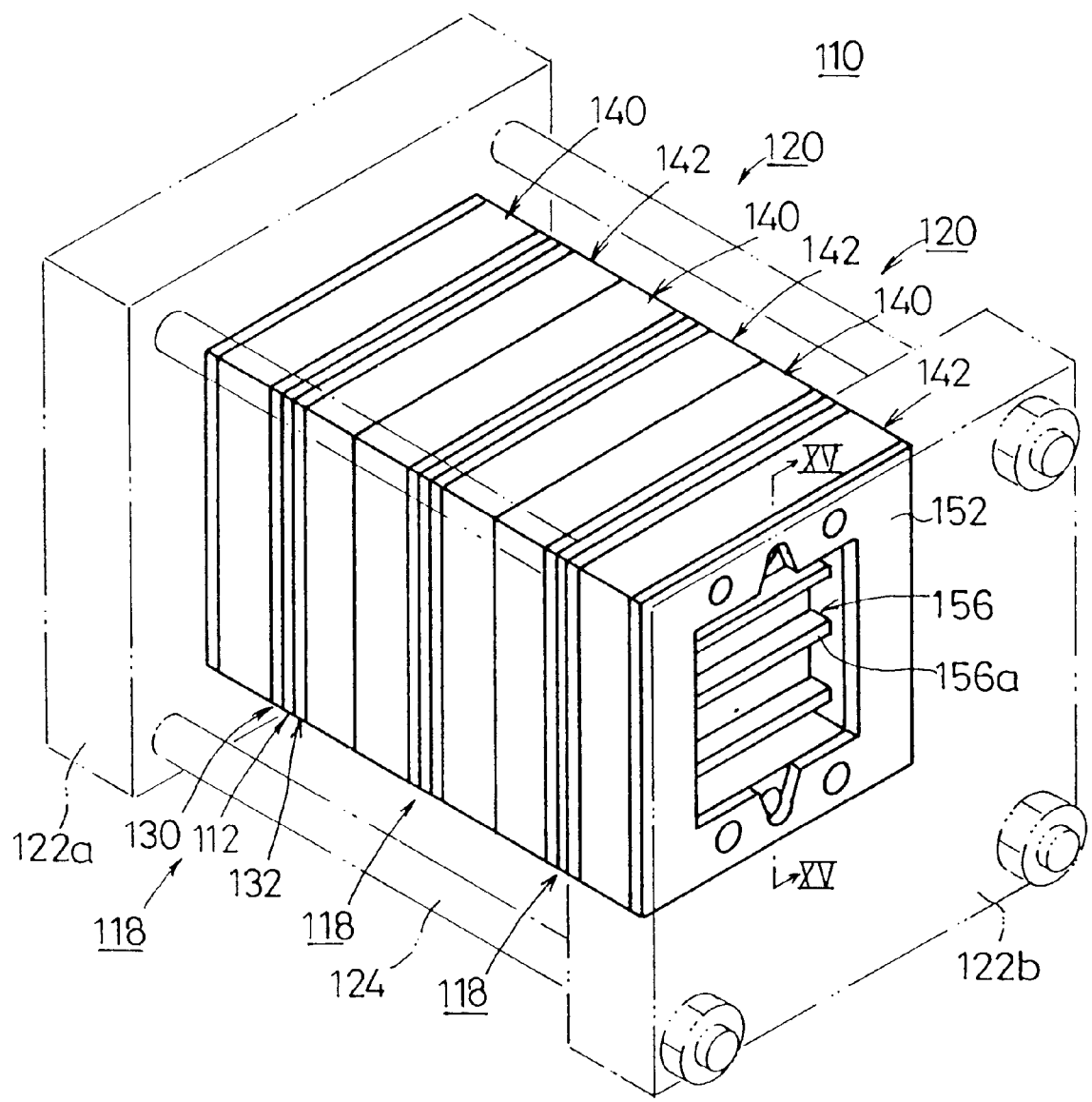
FIG. 12 is a perspective view of a fuel cell according to a third embodiment of the present invention.
Figure 13:
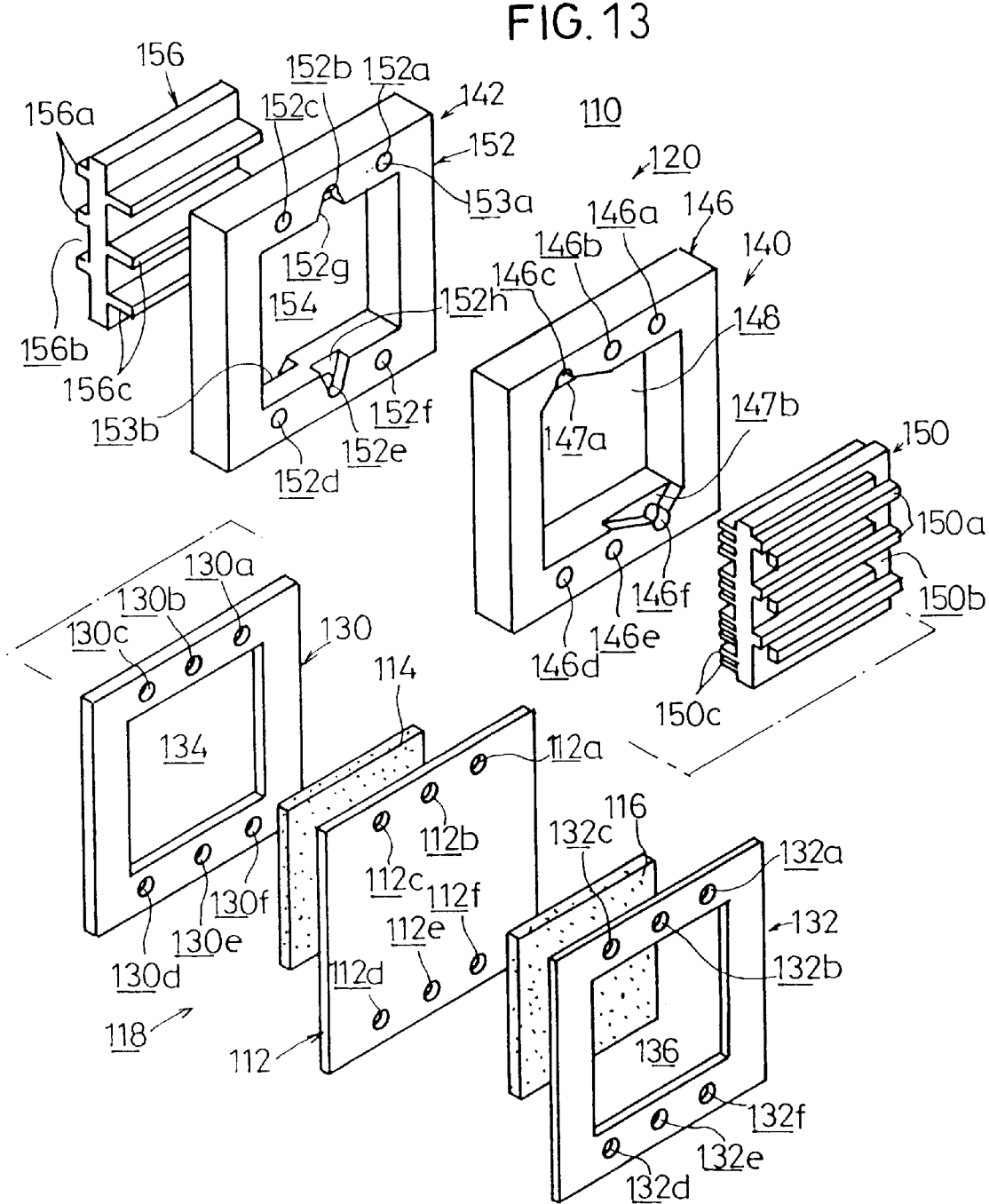
FIG. 13 is a partial exploded perspective view of the fuel cell according to the third embodiment.

FIGS. 12 and 13 show a fuel cell 110 according to the third embodiment. The fuel cell 110 comprises three fuel cell structures 118 each having a cathode electrode 114 and an anode electrode 116 which face each other with a solid polymer electrolyte membrane 112 interposed therebetween, and separators 120 which sandwich the three fuel cell structures 118. The fuel cell structures 118 and the separators 120 are fixedly held together by a pair of end plates 122a, 122b and tie rods 124 (see FIG. 12).

As shown in FIG. 13, the electrolyte membrane 112 has a fuel gas introduction hole 112a, a cooling medium discharge hole 112b, and an oxygen containing gas introduction hole 112c which are defined in an upper portion thereof, and also has a fuel gas discharge hole 112d, a cooling medium introduction hole 112e, and an oxygen containing gas discharge hole 112f which are defined in a lower portion thereof.

A first gasket 130 and a second gasket 132 are disposed one on each side of the fuel cell structure 118. The first gasket 130 has a large opening 134 for accommodating the cathode electrode 114 therein, and the second gasket 132 has an opening 136 for accommodating the anode electrode 116. The first gasket 130 and the second gasket 132 have respective fuel gas introduction holes 130a, 132a, respective cooling medium discharge holes 130b, 132b, and respective oxygen containing gas introduction holes 130c, 132c which are defined in an upper portion thereof, and also have respective fuel gas discharge holes 130d, 132d, respective cooling medium introduction holes 130e, 132e, and respective oxygen containing gas discharge holes 130f, 132f which are defined in a lower portion thereof.

The separator 120 has a first separator member (cathode-side element member) 140 and a second separator member (anode-side element member) 142.

The first separator member 140 has a first manifold plate 146 which comprises a rectangular flat plate, and has a large opening 148 defined centrally therein. The first manifold plate 146 has a fuel gas introduction hole 146a, a cooling medium discharge hole 146b, and an oxygen containing gas introduction hole 146c which are defined in an upper portion thereof, and also has a fuel gas discharge hole 146d, a cooling medium introduction hole 14e, and an oxygen containing gas discharge hole 146f which are defined in a lower portion thereof. The holes 146c, 146f communicate with the opening 148 through respective recesses 147a, 147b that are defined in one surface of the first manifold plate 146 which faces the cathode electrode 114 in diagonally opposite positions.

Figure 14:
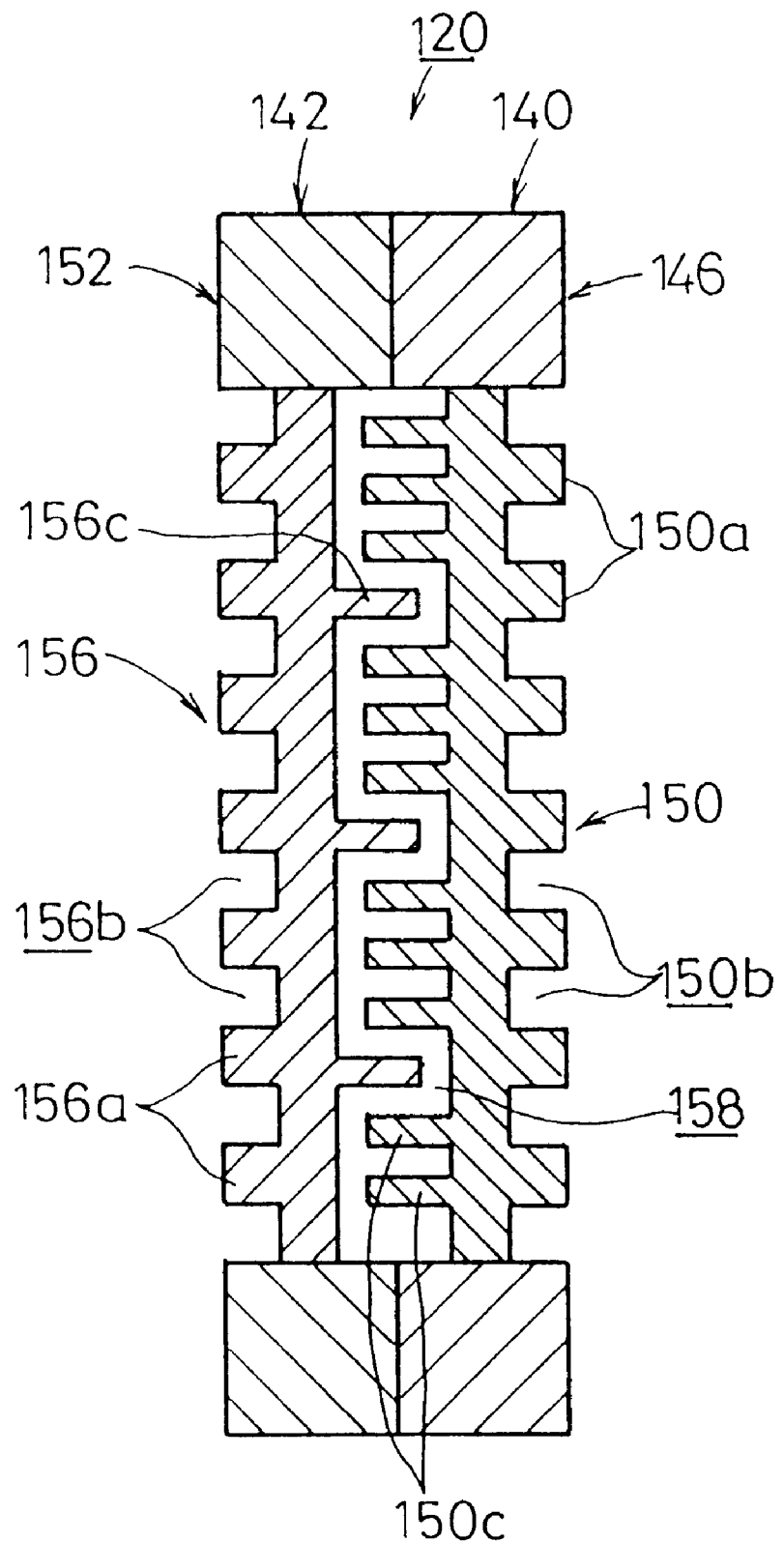
FIG. 14 is a vertical cross-sectional view of a separator of the fuel cell according to the third embodiment.

An oxygen containing gas flow rectifying plate 150 is fitted in the opening 148 in the first manifold plate 146. As shown in FIGS. 13 and 14, the oxygen containing gas flow rectifying plate 150 has a plurality of horizontal ridges 150a disposed on one surface thereof facing the cathode electrode 114 and extending parallel to each other in staggering relationship, thus defining an oxygen containing gas passage 150b that is tortuous in the vertical direction. The oxygen containing gas flow rectifying plate 150 also has a plurality of, e.g., eleven, horizontal heat exchange fins (increased contact area regions) 150c projecting on the other surface thereof (which defines a cooling medium passage, described later on) and extending parallel to each other, for increasing an area of contact with a cooling medium.

The second separator member 142 is identical in structure to the first separator member 140. The second separator member 142 comprises a second manifold plate 152 and a fuel gas flow rectifying plate 156 fitted in an opening 154 in the second manifold plate 152.

The second manifold plate 152 has a fuel gas introduction hole 152a, a cooling medium discharge hole 152b, and an oxygen containing gas introduction hole 152c which are defined in an upper portion thereof, and also has a fuel gas discharge hole 152d, a cooling medium introduction hole 152e, and an oxygen containing gas discharge hole 152f which are defined in a lower portion thereof. The holes 152a, 152d communicate with the opening 154 through respective recesses 153a, 153b that are defined in one surface of the second manifold plate 152 which faces away from the first separator member 140. The holes 152b, 152eare open into the opening 154 through respective recesses 152g, 152h that are defined in the other surface of the second manifold plate 152 which faces the first separator member 140.

As shown in FIGS. 13 and 14, the fuel gas flow rectifying plate 156 has a plurality of horizontal ridges 156a disposed on one surface thereof and extending parallel to each other in staggering relationship, thus defining a fuel gas passage 156b that is tortuous in the vertical direction. The fuel gas flow rectifying plate 156 also has a plurality of, e.g., three, heat exchange fins (increased contact area regions) 156c projecting on the other surface thereof (which defines a cooling medium passage, described later on), for increasing an area of contact with a cooling medium.

The oxygen containing gas flow rectifying plate 150 and the fuel gas flow rectifying plate 156 are made of corrosion-resistant, electrically conductive metal such as carbon, stainless steel, Inconel (trademark), or the like, electrically conductive rubber, electrically conductive resin, or a combination thereof.

As shown in FIG. 14, when the first and second separator members 140, 142 are assembled together into the separator 120, a cooling medium passage 158 is defined between the oxygen containing gas flow rectifying plate 150 and the fuel gas flow rectifying plate 156. The cooling medium passage 158 communicates with the holes 152b, 152e through the recesses 152g, 152h in the second manifold plate 152 (see FIG. 15).

Instead of defining the recesses 152g, 152h in the second manifold plate 152, recesses may be defined in the first manifold plate 146 to provide communication between the holes 146b, 146e. Alternatively, recesses may be defined in both the first and second manifold plates 146, 152.

Operation of the fuel cell 110 thus constructed will be described below.

When a fuel gas (a hydrogen containing gas) is supplied to the fuel cell 110, the fuel gas is introduced into the hole 146a in the first manifold plate 146 of the first separator member 140 and the hole 152a in the second manifold plate 152 of the second separator member 142, and a portion of the fuel gas is supplied from the hole 152a into the passage 156b of the fuel gas flow rectifying plate 156.

An oxygen containing gas (air) supplied to the fuel cell 110 is introduced into the hole 146c in the first manifold plate 146 and the hole 152c in the second manifold plate 152, and a portion of the oxygen containing gas is supplied from the hole 146c into the passage 150b of the oxygen containing gas flow rectifying plate 150. In this manner, the anode electrode 116 of the fuel cell structure 118 is supplied with the fuel gas, and the cathode electrode 114 thereof is supplied with the oxygen containing gas, for thereby enabling the fuel cell structure 118 to generate electric energy.

Figure 15:
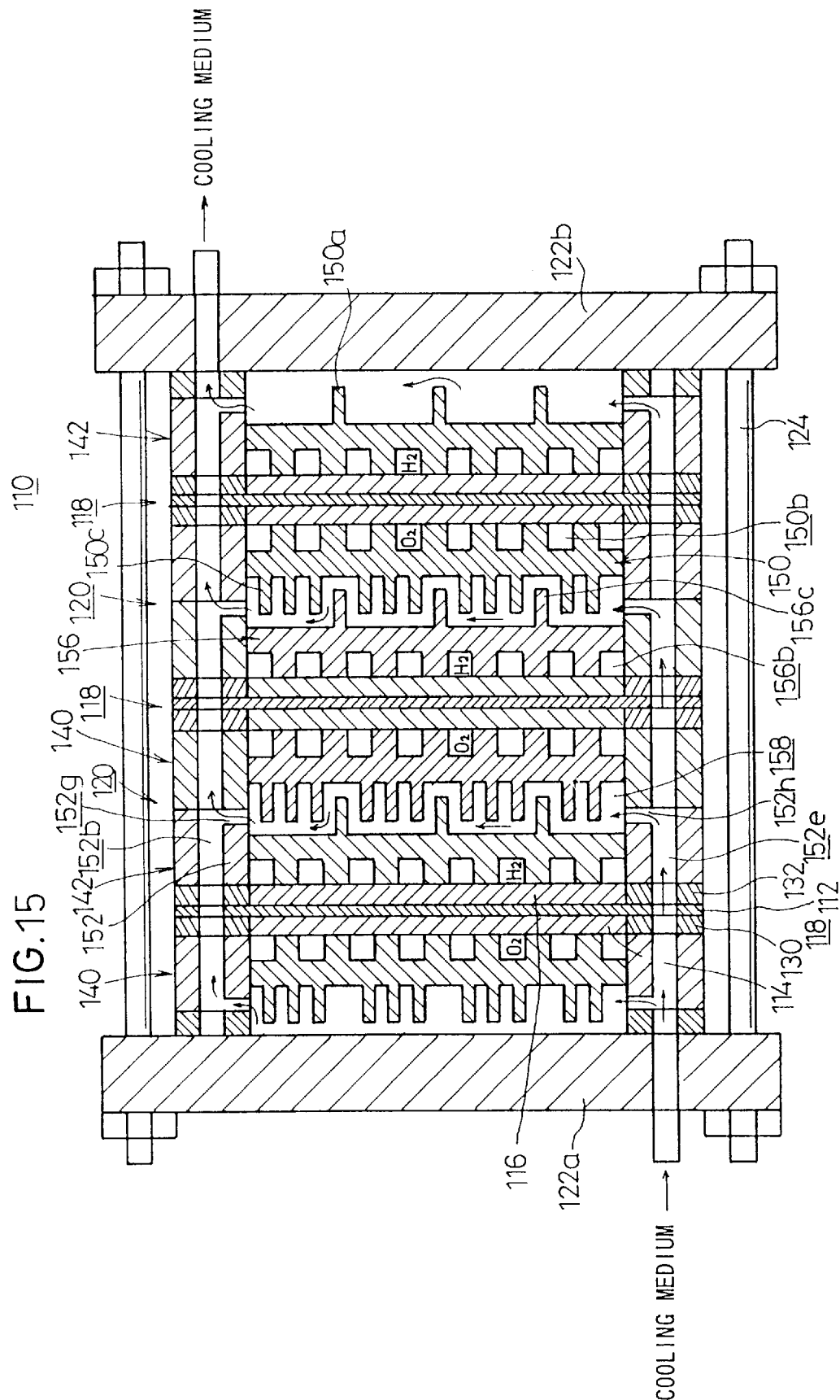
FIG. 15 is a cross-sectional view taken along line XV—XV of FIG. 12.

As shown in FIG. 15, a cooling medium is supplied to a lower portion of the fuel cell 110. The cooling medium comprises water, methanol, a mixed solution of water and methanol, an operating gas (before or after used) for fuel cells, or a substance having a boiling point equal to or lower than the operating temperature of the fuel cell 110.

Specifically, the cooling medium may be made of an inorganic compound such as water (100° C.), ammonia (−33.43° C.), carbon dioxide (−78.5° C.), argon (−185.869° C.), or nitrogen (−195.8° C.), or an organic compound such as an alcohol such as methanol (64.51° C.), ethanol (78.3° C.), isopropanol (82.33° C.), or the like, an aldehyde or ketone such as acetoaldehyde (20.4° C.), acetone (56.12° C.), ethyl methyl ketone (79.59° C.), formaldehyde (−19.1° C.), or the like, an ether such as ethyl propyl ether (63.86° C.), ethyl methyl ether (7.35° C.), diethyl ether (34.55° C.), dimethyl ether (−24.84° C.), diisopropyl ether (68.47° C.), or the like, a saturated hydrocarbon such as methane (−161.49° C.), ethane (−88.63° C.), propane (−42.07° C.), butane (−0.5° C.), pentane (36.07° C.), isopentane (27.85° C.), hexane (68.74° C.), isohexane (60.27° C.), or the like, an ester such as methyl formate (31.76° C.), ethyl formate (57° C.), ethyl acetate (77.17° C.), vinyl acetate (72.92° C.), methyl acetate (57° C.), or the like, or a cyclic compound such as cyclobutane (12.51° C.), cyclopropane (−32.87° C.), cyclohexane (80.74° C.), cyclopentane (49.26° C.), hexafluorobenzene (80.26° C.), perfluorocyclohexane (52.52° C.), or the like. The numerical values in the parentheses indicate boiling points of the substances under normal pressure.

A cooling medium supplied to the lower portion of the fuel cell 110 is introduced through the recesses 152e, 152h in the second manifold plate 152 into the passage 158 defined between the fuel gas flow rectifying plate 156 and the oxygen containing gas flow rectifying plate 150, and flows upwardly through the passage 158. The cooling medium is then discharged out of the fuel cell 110 through the hole 152b in the upper portion of the second manifold plate 152 and the hole 146b in the first manifold plate 146.

In the third embodiment, the separator 120 is constructed of the first and second separator members 140, 142, and the cooling medium passage 158 is defined directly between the oxygen containing gas flow rectifying plate 150 which has the oxygen containing gas passage 150b on one surface thereof and the fuel gas flow rectifying plate 156 which has the fuel gas passage 156b on one surface thereof. Therefore, the number of parts is greatly reduced, reducing the weight of the separator 120 as a whole and making it compact, compared with a fuel cell which uses a dedicated cooling plate for passing a cooling medium.

In the third embodiment, furthermore, the fins 150c project on the oxygen containing gas flow rectifying plate 150 into the passage 158, and the fins 156c project on the fuel gas flow rectifying plate 156 into the passage 158 for increasing the cooling efficiencies of the cathode electrode 114 and the anode electrode 116.

The fins 150c, 156c can individually designed with respect to shape, dimensions, and number for thereby reliably selecting a cooling efficiency optimum for the cathode electrode 114 and the anode electrode 116 depending on the functions of the cathode electrode 114 and the anode electrode 116.

Specifically, the cooling efficiency of the cathode electrode 114 is established to remove the heat generated by the cathode electrode 114 due to a reaction of the fuel cell 110 for thereby preventing the ionic conduction component in the cathode electrode 114 from being dried and also preventing the electrolyte membrane 112 on the side of the cathode electrode 114 from being dried, and also to allow water to find its way easily into the ionic conduction component in the cathode electrode 114 and the electrolyte membrane 112 on the side of the cathode electrode 114 for humidifying the oxygen containing gas. The cooling efficiency of the anode electrode 116 is established to allow water to find its way easily into the ionic conduction component in the anode electrode 116 and the electrolyte membrane 112 on the side of the anode electrode 116 for humidifying the fuel gas.

Therefore, the cathode electrode 114 and the anode electrode 116 often tend to have different cooling efficiencies, and the fins 150c, 156c are different in shape, dimensions, and number depending on the different cooling efficiencies. Consequently, the cooling efficiencies of the cathode electrode 114 and the anode electrode 116 can be set to optimum values.

In the third embodiment, furthermore, the fins 150c of the oxygen containing gas flow rectifying plate 150 and the fins 156c of the fuel gas flow rectifying plate 156 are held in contact with the cooling medium only, and thermal conduction between the cathode electrode 114 and the anode electrode 116 is carried out through the solid polymer electrolyte membrane 112 only. Since any thermal conduction through the separators 120 is blocked, the selective cooling efficiency is further increased.

While the fins 150c, 156c are employed as increased contact area regions in the third embodiment, the increased contact area regions are not limited to the fins, but recesses or various modified surfaces may be employed insofar as they can increase an area of contact with the cooling medium.

A fuel cell according to a fourth embodiment of the present invention will be described below.

Figure 16:
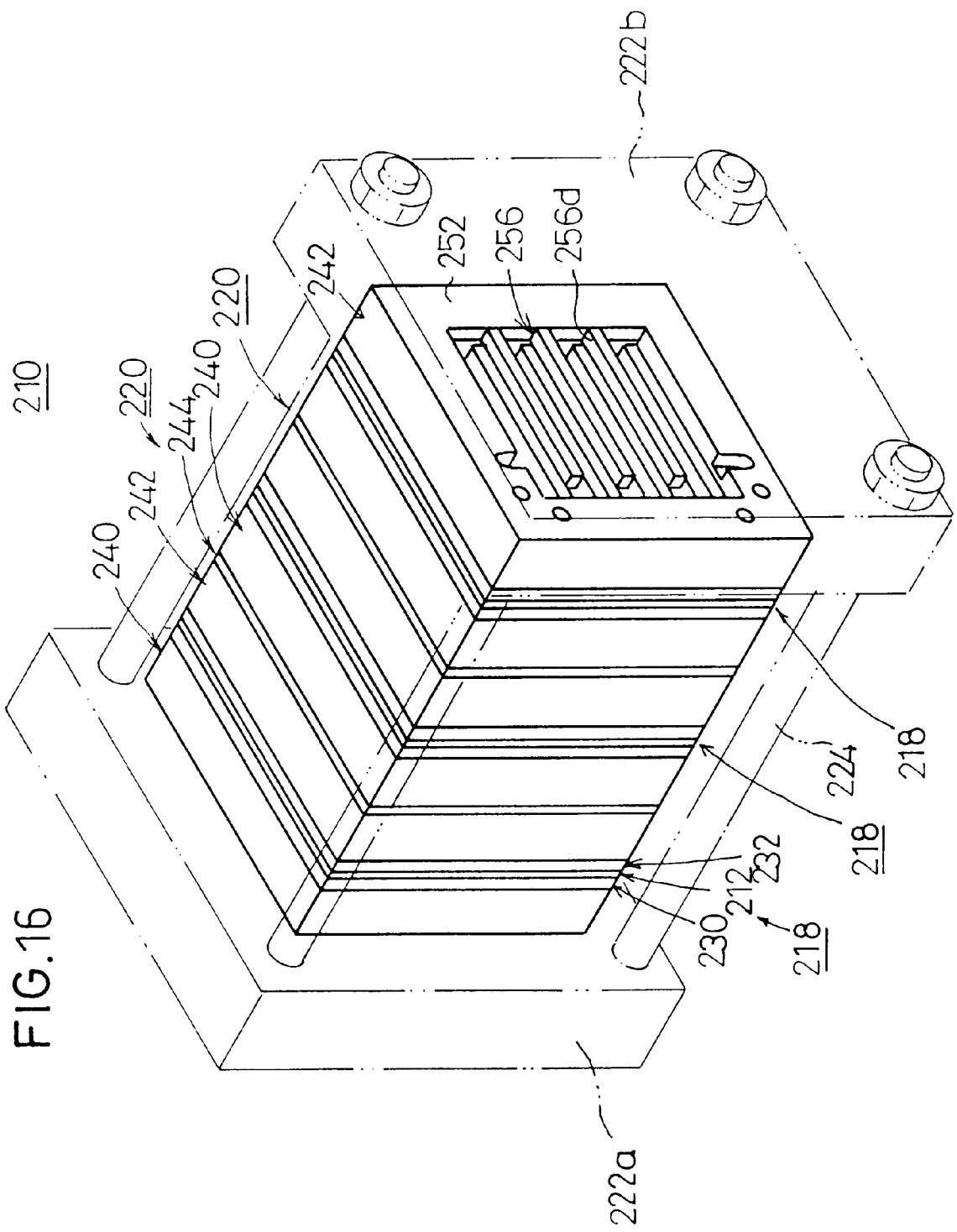
FIG. 16 is a perspective view of a fuel cell according to a fourth embodiment of the present invention.
Figure 17:
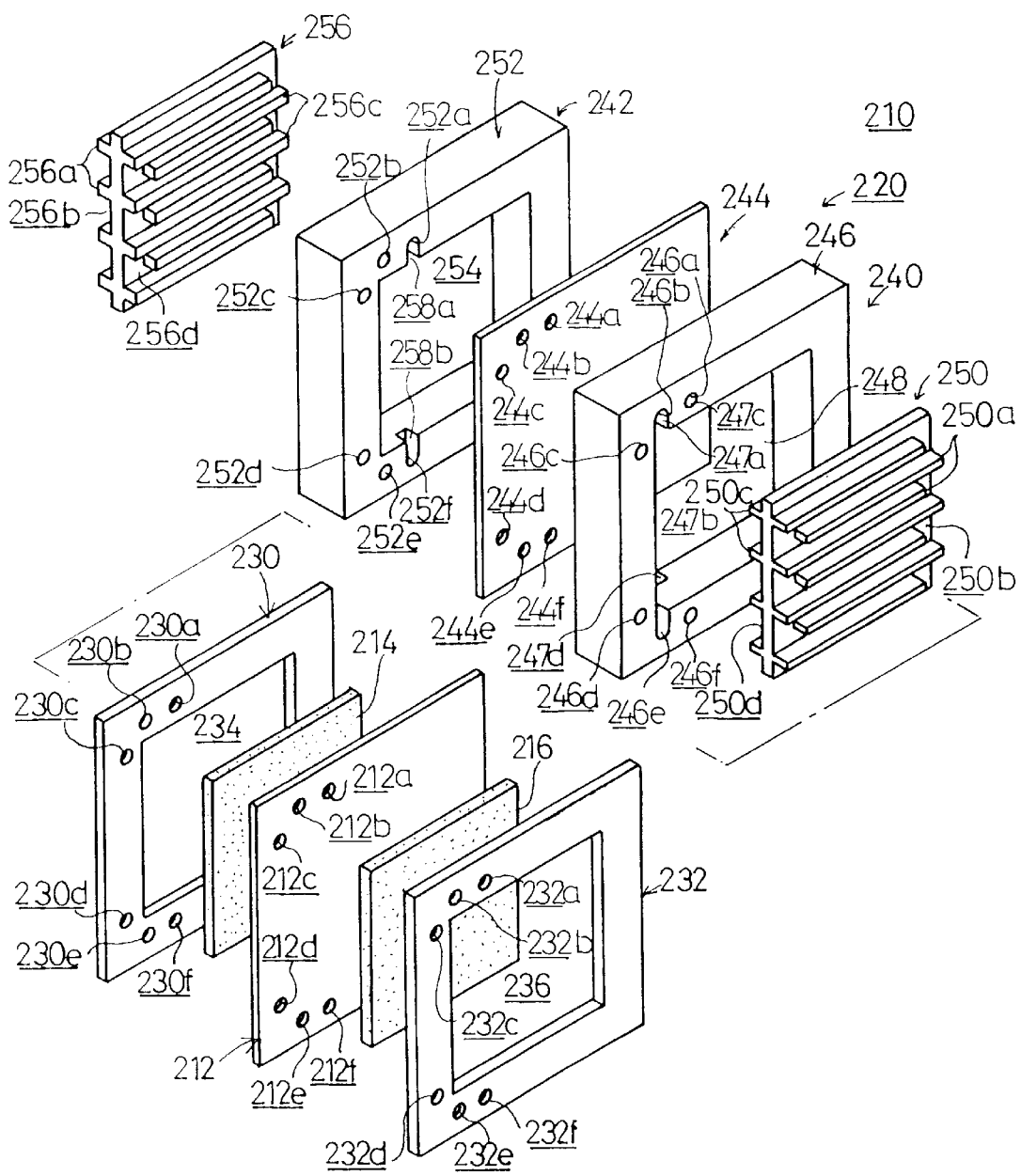
FIG. 17 is a partial exploded perspective view of the fuel cell according to the fourth embodiment.
Figure 18:
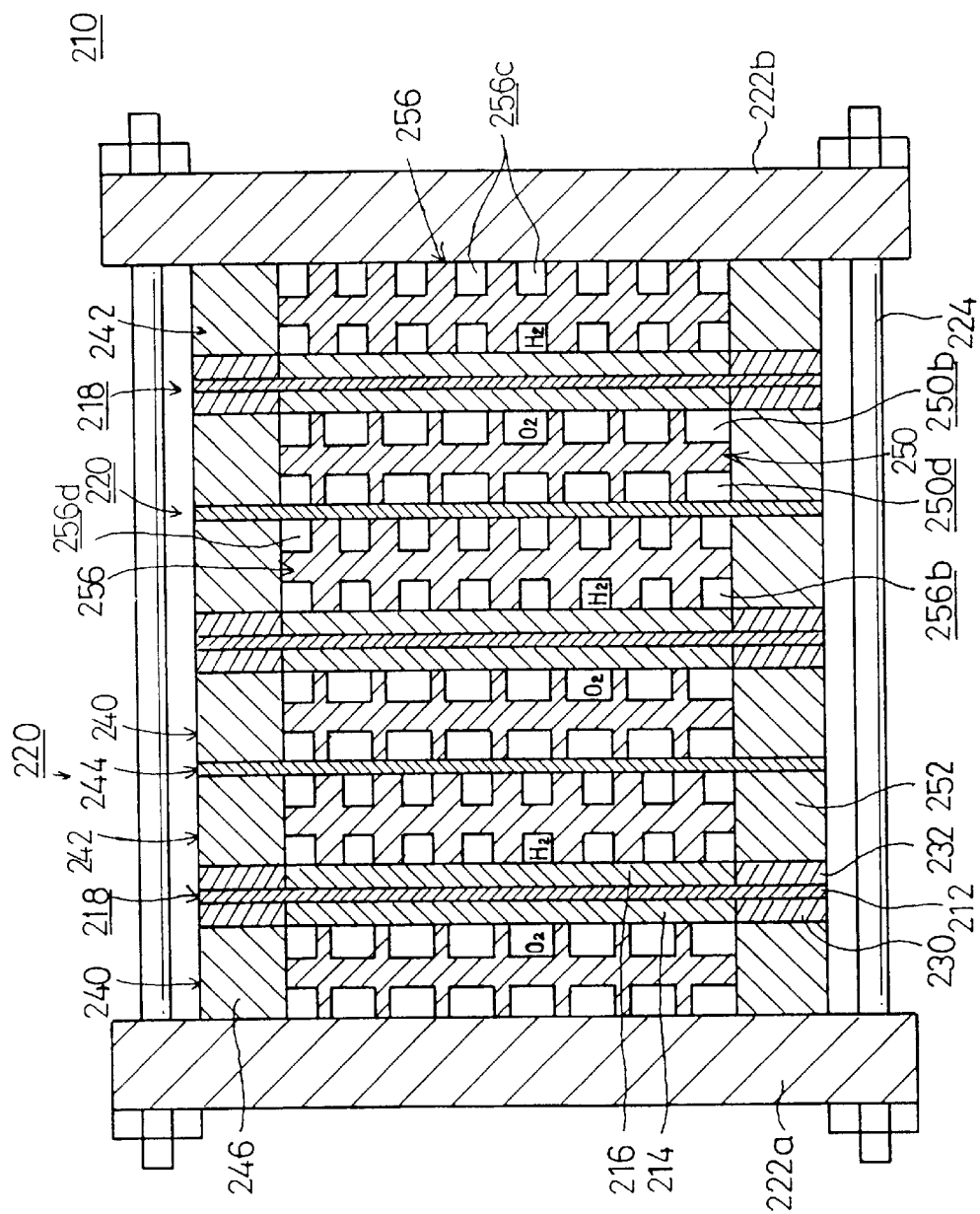
FIG. 18 is a vertical cross-sectional view of the fuel cell according to the fourth embodiment.

FIGS. 16 through 18 show a fuel cell 210 according to the fourth embodiment. The fuel cell 210 comprises fuel cell structures 218 each having a cathode electrode 214 and an anode electrode 216 which sandwich a solid polymer electrolyte membrane 212 therebetween, and separators 220 which sandwich the fuel cell structures 218. The fuel cell structures 218 and the separators 220 are fixedly held together by a pair of end plates 222a, 222b and tie rods 224.

The electrolyte membrane 212 has a cooling medium (temperature regulating medium) discharge hole 212a, an oxygen containing gas introduction hole 212b, and a fuel gas introduction hole 212c which are defined in an upper portion thereof, and also has a fuel gas discharge hole 212d, an oxygen containing gas discharge hole 212e, and a cooling medium introduction hole 212f which are defined in a lower portion thereof.

A first gasket 230 and a second gasket 232 are disposed one on each side of the electrolyte membrane 212. The first gasket 230 has a large opening 234 for accommodating the cathode electrode 214 therein, and the second gasket 232 has an opening 236 for accommodating the anode electrode 216. The first gasket 230 and the second gasket 232 have respective cooling gas discharge holes 230a, 232a, respective oxygen containing gas introduction holes 230b, 232b, and respective fuel gas introduction holes 230c, 232c which are defined in an upper portion thereof, and also have respective fuel gas discharge holes 230d, 232d, respective oxygen containing gas discharge holes 230e, 232e, and respective cooling medium introduction holes 230f, 232f which are defined in a lower portion thereof.

The separator 220 has a first separator member 240 held against the cathode electrode 214, a second separator member 242 held against the anode electrode 216, and a separating plate (partition wall) 244 sandwiched between the first and second separator members 240, 242.

The first separator member 240 has a first manifold plate 246 and an oxygen containing gas flow rectifying plate 250 fitted in a relatively large opening 248 defined in the first manifold plate 246.

The first manifold plate 246 comprises a rectangular flat plate made of dense carbon, and has a cooling medium discharge hole 246a, an oxygen containing gas introduction hole 246b, and a fuel gas introduction hole 246c which are defined in an upper portion thereof, and also has a fuel gas discharge hole 246d, an oxygen containing gas discharge hole 246e, and a cooling medium introduction hole 246f which are defined in a lower portion thereof.

The holes 246b, 24e communicate with the opening 248 through respective recesses 247a, 247b that are defined in one surface of the first manifold plate 246 which faces the cathode electrode 214. The holes 246a, 246f communicate with the opening 248 through respective recesses 247c, 247d that are defined in the other surface of the first manifold plate 246 (see FIGS. 17 and 19).

The oxygen containing gas flow rectifying plate 250 is made of corrosion-resistant, electrically conductive metal such as carbon, stainless steel, Inconel (trademark), or the like, electrically conductive rubber, electrically conductive resin, or a combination thereof. The oxygen containing gas flow rectifying plate 250 has a plurality of horizontal ridges 250a disposed on one surface thereof and extending parallel to each other in staggering relationship, thus defining a first gas passage 250b that is tortuous in the vertical direction (see FIG. 19). The oxygen containing gas flow rectifying plate 250 also has a plurality of similar horizontal ridges 250c projecting on the other surface thereof and extending parallel to each other in staggering relationship, thus defining a first cooling medium passage (temperature regulating medium passage) 250d which has the same passage structure as the first gas passage 250b.

The second separator member 242 has a second manifold plate 252 and a fuel gas flow rectifying plate 256 fitted in a relatively large hole 254 defined in the second manifold plate 252. The second manifold plate 252 is identical in structure to the first manifold plate 246. The second manifold plate 252 has a cooling medium discharge hole 252a, an oxygen containing gas introduction hole 252b, and a fuel gas introduction hole 252c which are defined in an upper portion thereof, and also has a fuel gas discharge hole 252d, an oxygen containing gas discharge hole 252e, and a cooling medium introduction hole 252f which are defined in a lower portion thereof.

The holes 252a, 252f communicate with the opening 254 through respective recesses 258a, 258b that are defined in one surface of the second manifold plate 252 which faces the first separator member 240. The holes 252c, 252d communicate with the opening 254 through respective recesses 258c, 258d that are defined in the other surface of the second manifold plate 252 (see FIGS. 17 and 20).

The fuel gas flow rectifying plate 256 is made of water-permeable carbon. The fuel gas flow rectifying plate 256 has a plurality of horizontal ridges 256a disposed on one surface thereof and extending parallel to each other in staggering relationship, thus defining a second gas passage 256b. The oxygen containing gas flow rectifying plate 256 also has a plurality of similar horizontal ridges 256c projecting on the other surface thereof and extending parallel to each other in staggering relationship, thus defining a second cooling medium passage (temperature regulating medium passage) 256d. The first gas passage 256b and the second cooling medium passage 256d have the same passage structure as each other, and have opposite directions of flow to each other (see FIG. 20).

Figure 21:
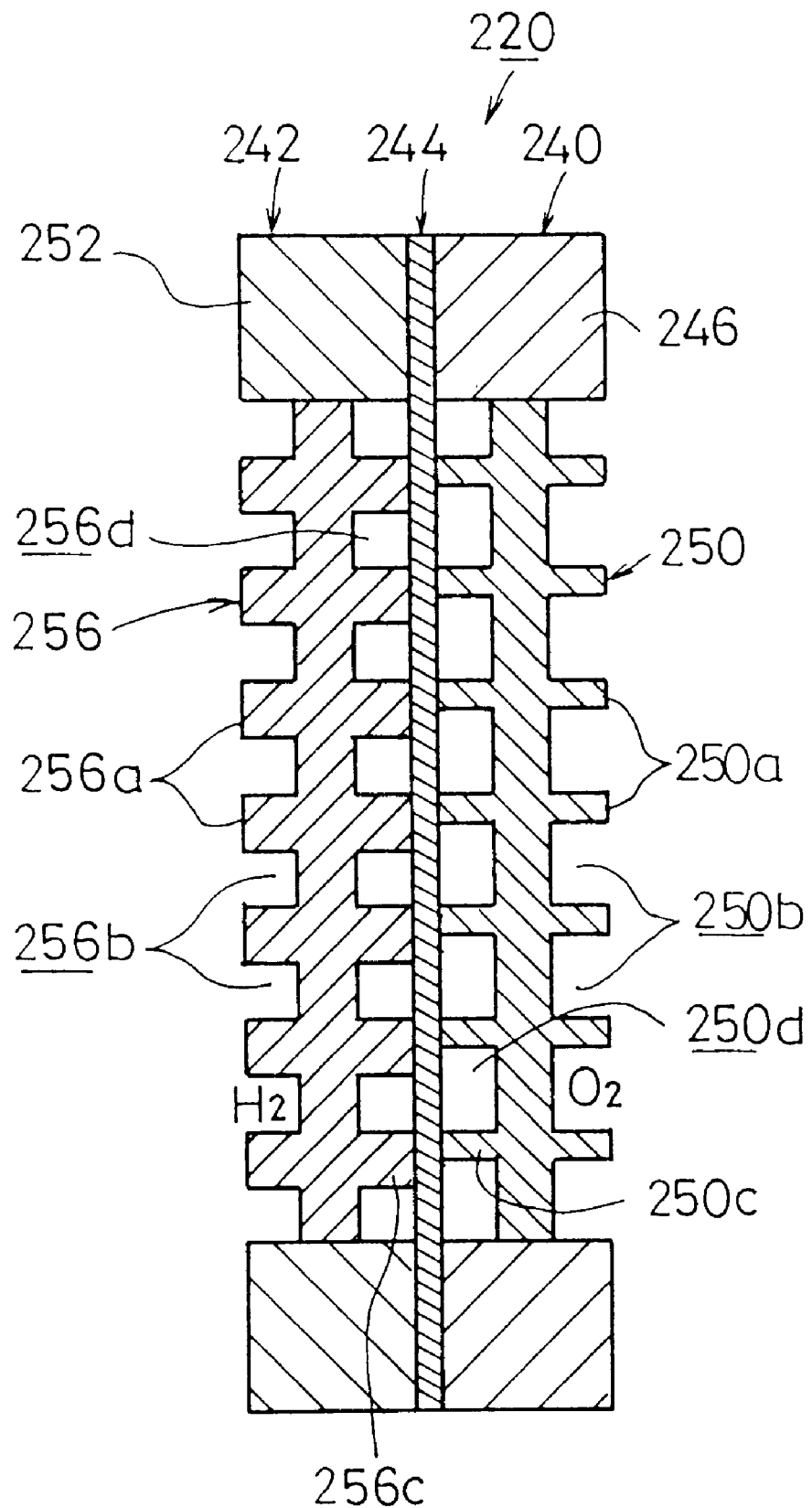
FIG. 21 is a vertical cross-sectional view of a separator of the fuel cell according to the fourth embodiment.

As shown in FIG. 21, the cross-sectional area of the first gas passage 250b and the cross-sectional area of the first cooling medium passage 250d are greater than the cross-sectional area of the second gas passage 256b and the cross-sectional area of the second cooling medium passage 256d.

The separating plate 244 is made of dense carbon, and has a cooling medium discharge hole 244a, an oxygen containing gas introduction hole 244b, and a fuel gas introduction hole 244c which are defined in an upper portion thereof, and also has a fuel gas discharge hole 244d, an oxygen containing gas discharge hole 244e, and a cooling medium introduction hole 244f which are defined in a lower portion thereof.

Operation of the fuel cell 210 thus constructed will be described below.

Figure 20:
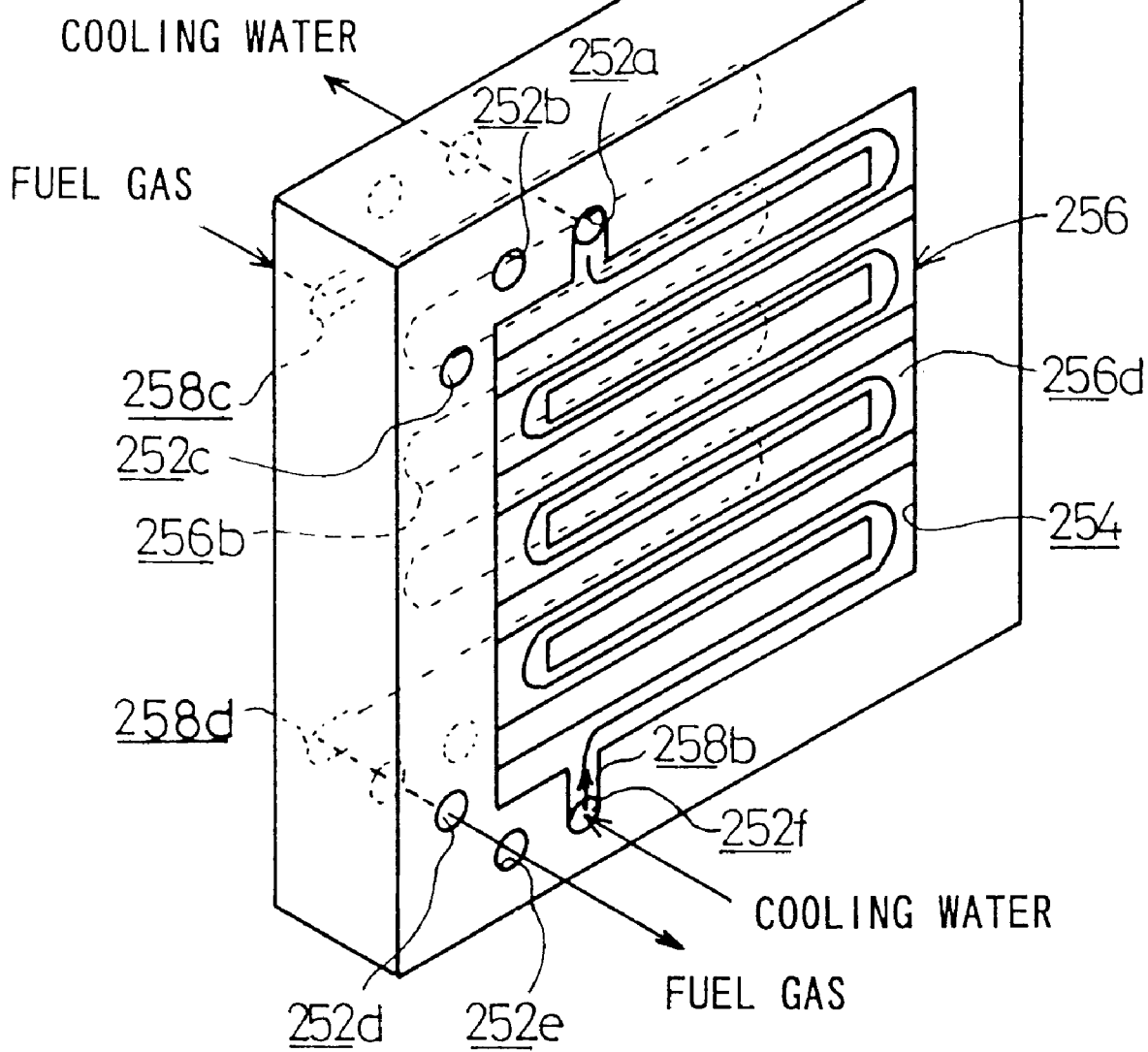
FIG. 20 is a perspective view showing a gas passage and a cooling medium passage which are defined in a fuel gas flow rectifying plate of the fuel cell according to the fourth embodiment.

When a fuel gas (a hydrogen containing gas) is supplied to the fuel cell 210, the fuel gas is supplied into the hole 246c in the first manifold plate 246 of the first separator member 240, the hole 244c in the separating plate 244, and the hole 252c in the second manifold plate 252 of the second separator member 242, and introduced from the recess 258c communicating with the hole 252c into the second gas passage 256b of the fuel gas flow rectifying plate 256 (see FIG. 20). Therefore, the fuel gas flows in the direction of gravity tortuously along the second gas passage 256b, and is discharged from the recess 258d into the hole 252d.

Figure 19:
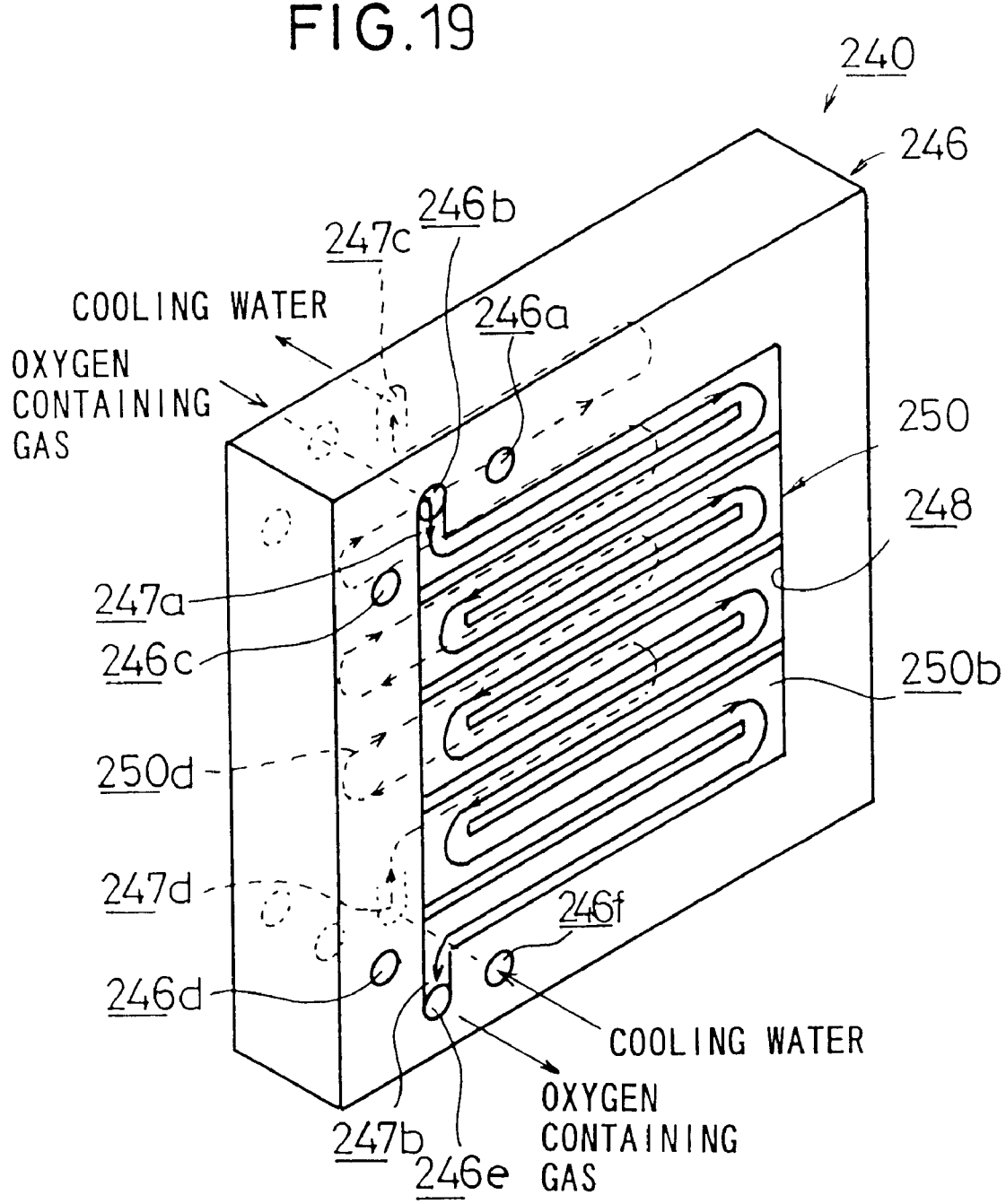
FIG. 19 is a perspective view showing a gas passage and a cooling medium passage which are defined in an oxygen containing gas flow rectifying plate of the fuel cell according to the fourth embodiment.

When an oxygen containing gas is supplied to the fuel cell 110, the oxygen containing gas is supplied into the hole 246b in the first manifold plate 146, the hole 244b in the separating plate 244, and the hole 252b in the second manifold plate 252, and introduced through the recess 247a communicating with the hole 246b into the first gas passage 250b of the oxygen containing gas flow rectifying plate 250. Therefore, as shown in FIG. 19, the oxygen containing gas flows in the direction of gravity tortuously along the first gas passage 250b, and is discharged from the hole 246e. In this manner, the anode electrode 216 of the fuel cell structure 218 is supplied with the fuel gas, and the cathode electrode 214 thereof is supplied with the oxygen containing gas.

A cooling medium which is supplied to the fuel cell 110 comprises water, methanol, or a mixed solution of water and methanol. When the cooling medium is supplied into the hole 246f in the first manifold plate 246, a portion of the cooling medium is introduced from the recess 247d into the first cooling medium passage 250d of the oxygen containing gas flow rectifying plate 250. Therefore, as shown in FIG. 19, the cooling medium flows in a direction opposite to the direction of gravity tortuously along the first cooling medium passage 250d of the oxygen containing gas flow rectifying plate 250, and is discharged into the hole 246a in the first manifold plate 246.

A portion of the cooling medium introduced into the hole 242f in the second manifold plate 252 is introduced from the recess 258b into the second cooling medium passage 256d of the fuel gas flow rectifying plate 256. Therefore, as shown in FIG. 20, the cooling medium flows in a direction opposite to the direction of gravity tortuously along the second cooling medium passage 256d of the fuel gas flow rectifying plate 256, and is discharged into the hole 252a in the second manifold plate 252.

In the fourth embodiment, as shown in FIG. 19, the first gas passage 250b for passing the oxygen containing gas in the direction of gravity is defined on one surface of the oxygen containing gas flow rectifying plate 250, and the first cooling medium passage 250d which is identical in structure to the first gas passage 250b for passing the cooling medium in a direction opposite to the direction of gravity is defined on the other surface of the oxygen containing gas flow rectifying plate 250.

Specifically, the oxygen containing gas is at a highest temperature at the outlet (near the hole 246e) of the first gas passage 250b as compared with the inlet (near the hole 246b) thereof. Therefore, when the cooling medium is introduced from the hole 246f corresponding to the hole 246e where the temperature of the oxygen containing gas is high, the efficiency of heat exchange between the cooling medium and the oxygen containing gas is increased, and the oxygen containing gas is reliably regulated in temperature to a condition free of temperature differences throughout from the inlet to the outlet of the first gas passage 250b, for thereby easily uniformizing the temperature of the electric generation section.

In the fuel gas flow rectifying plate 256, as shown in FIG. 20, the fuel gas flowing in the direction of gravity along the second gas passage 256b and the cooling medium flowing in a direction opposite to the direction of gravity along the second cooling medium passage 256d flow in opposite directions to each other through the identical passages. Consequently, the fuel gas is free of temperature differences on its travel from the inlet to the outlet, for thereby uniformizing the temperature of the electric generation section.

In the fourth embodiment, furthermore, the cross-sectional areas of the first gas passage 250b and the first cooling medium passage 250d are greater than the cross-sectional areas of the second gas passage 256b and the second cooling medium passage 256d. Specifically, since the fuel gas and the oxygen containing gas comprise a combination of a modified gas of methanol and air, a hydrogen containing gas and air, or a hydrogen containing gas and an oxygen containing gas, they have different viscosities. Therefore, if the fuel gas and the oxygen containing gas flowed at the same rate through the same cross-sectional area, then the oxygen containing gas would develop a higher head pressure than the fuel gas, tending to produce an inter-electrode differential pressure to damage the solid polymer electrolyte membrane 212 or impose a large load on the source of the oxygen containing gas.

If the fuel gas and the oxygen containing gas comprise a modified gas and air, respectively, then reductions in the rates of the fuel gas and air differ from each other due to the fuel utilization ratio and the air utilization ratio, such that the reduction in the rate of air is smaller than the reduction in the rate of the fuel gas.

As a consequence, it is necessary to make the cross-sectional area of the first gas passage 250b for the oxygen containing gas greater than the cross-sectional area of the second gas passage 256b for the fuel gas.

Furthermore, water produced by the reaction tends to be condensed on the wall of the oxygen containing gas flow rectifying plate 250 on the side of the cathode electrode 214. The cross-sectional area of the first gas passage 250b which is greater than the cross-sectional area of the second gas passage 256b is effective to prevent the gas passages from being blocked by condensed water and also to prevent a pulsating flow (slug flow or the like) from being developed for thereby allowing the oxygen containing gas to flow easily for maintaining a desired gas discharge efficiency.

In the fourth embodiment, the temperature regulating medium comprises a cooling medium for uniformly cooling the oxygen containing gas and the fuel gas. However, the temperature regulating medium may comprise a heating medium for heating the oxygen containing gas and the fuel gas as a whole to a uniform temperature.

A fuel cell according to a fifth embodiment will be described below.

Figure 22:
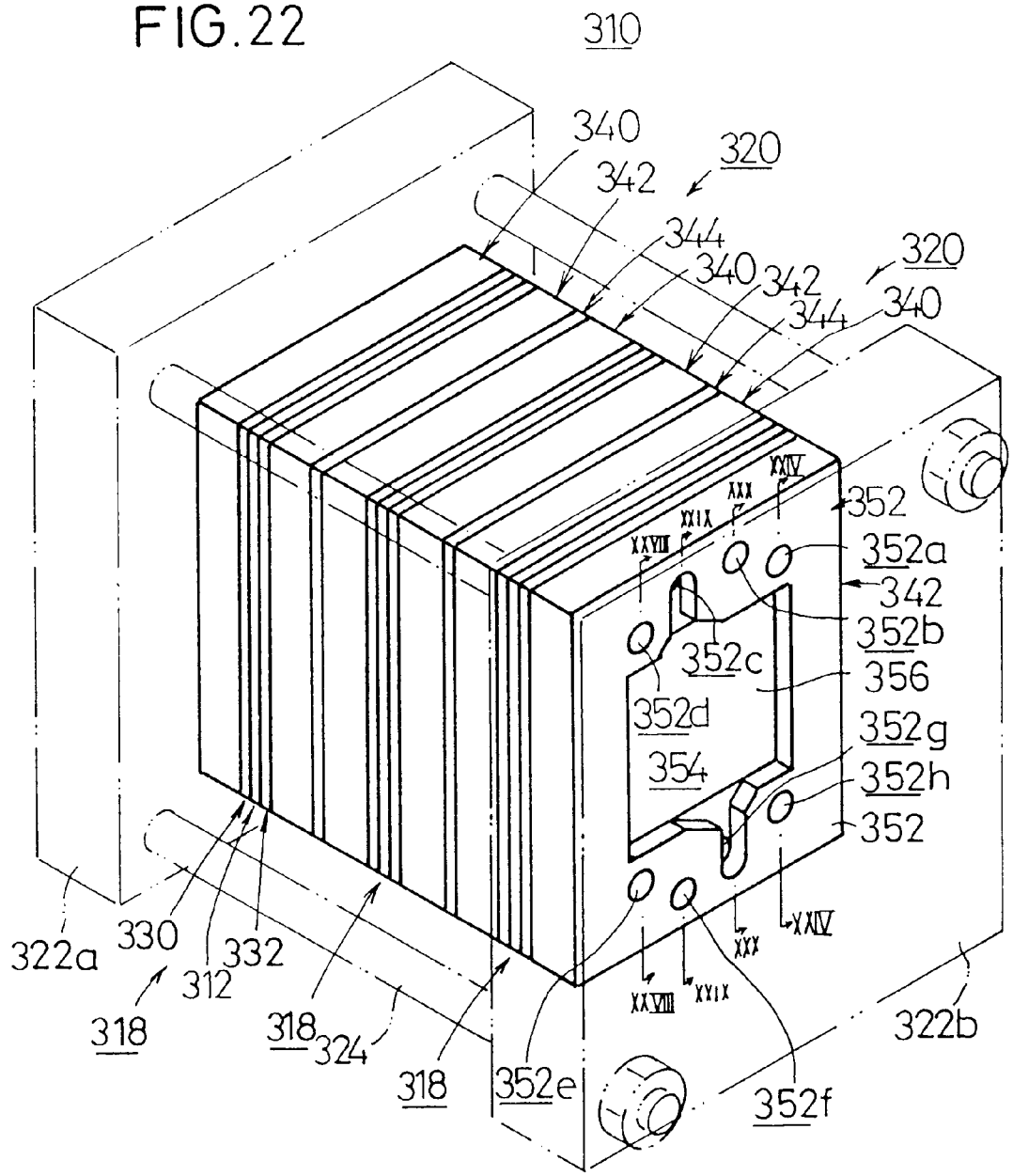
FIG. 22 is a perspective view of a fuel cell according to a fifth embodiment of the present invention.
Figure 23:
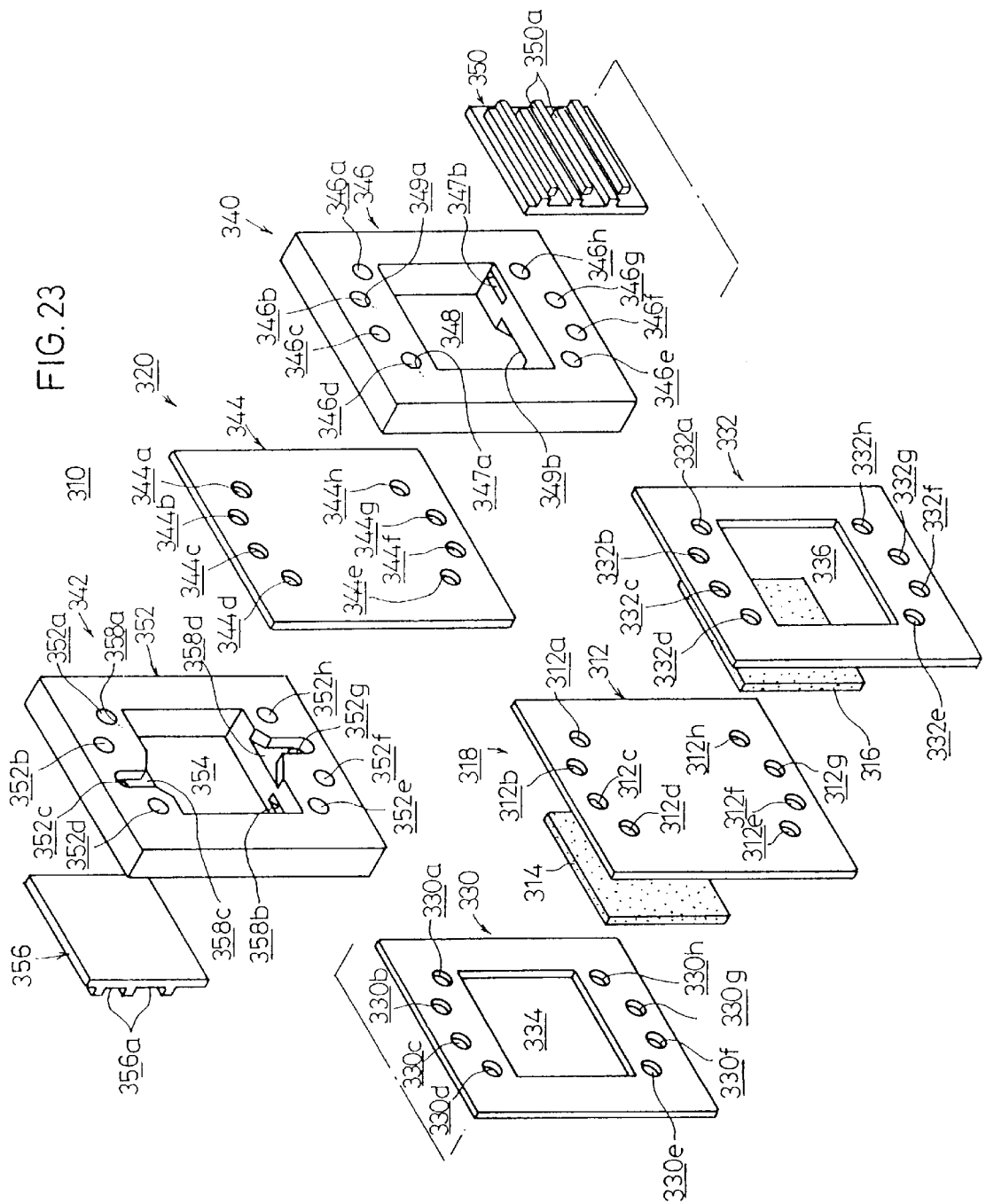
FIG. 23 is a partial exploded perspective view of the fuel cell according to the fifth embodiment.
Figure 24:
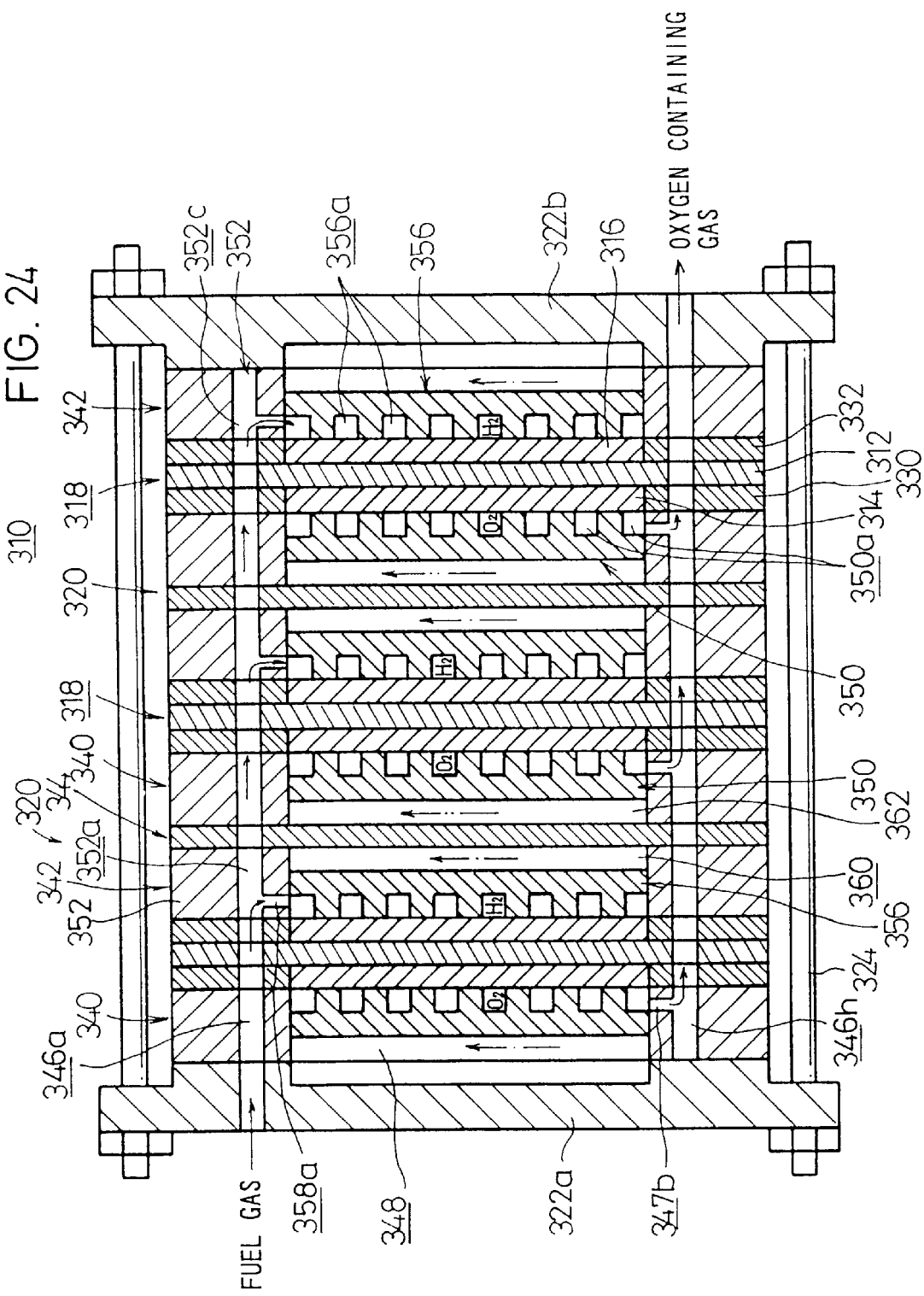
FIG. 24 is a cross-sectional view taken along line XXIV—XXIV of FIG. 22.

FIGS. 22 through 24 show a fuel cell 310 according to the fifth embodiment. The fuel cell 310 comprises three fuel cell structures 318 each having a cathode electrode 314 and an anode electrode 316 which sandwich a solid polymer electrolyte membrane 312 therebetween, and separators 320 which sandwich the three fuel cell structures 318. The fuel cell structures 318 and the separators 320 are fixedly held together by a pair of end plates 322a, 322b and tie rods 324.

As shown in FIG. 23, the electrolyte membrane 312 has a fuel gas introduction hole 312a, a cathode electrode cooling medium (second cooling medium) discharge hole 312b, a cooling water (first cooling medium) discharge hole 312c, and an oxygen containing gas introduction hole 312d which are defined in an upper portion thereof, and also has a fuel gas discharge hole 312e, a cathode electrode cooling medium introduction hole 312f, a cooling medium introduction hole 312g, and an oxygen containing gas discharge hole 312h which are defined in a lower portion thereof.

A first gasket 330 and a second gasket 332 are disposed one on each side of the fuel cell structure 318. The first gasket 330 has a large opening 334 for accommodating the cathode electrode 314 therein, and the second gasket 332 has an opening 336 for accommodating the anode electrode 316. The first gasket 330 and the second gasket 332 have respective fuel gas introduction holes 330a, 332a, respective cathode electrode cooling medium discharge holes 330b, 332b, respective cooling medium discharge holes 330c, 332c, and respective oxygen containing gas introduction holes 330d, 332d, which are defined in an upper portion thereof, and also have respective fuel gas discharge holes 330e, 332e, respective cathode electrode cooling medium introduction holes 330f, 332f, respective cooling medium introduction holes 330g, 332g, and respective oxygen containing gas discharge holes 330h, 332h which are defined in a lower portion thereof.

The separator 320 has a first separator member 340, a second separator member 342, and a separating plate 344 sandwiched between the first and second separator members 340, 342.

The first separator member 340 has a first manifold plate 346 which comprises a rectangular flat plate, and has a large opening 348 defined centrally therein. The first manifold plate 346 has a fuel gas introduction hole 346a, a cathode electrode cooling medium discharge hole 346b, a cooling water discharge hole 346c, and an oxygen containing gas introduction hole 346d which are defined in an upper portion thereof, and also has a fuel gas discharge hole 346e, a cathode electrode cooling medium introduction hole 346f, a cooling water introduction hole 346g, and an oxygen containing gas discharge hole 346h which are defined in a lower portion thereof. The holes 346d, 346h, which are disposed in diagonally opposite positions, communicate with respective recesses 347a, 347b defined in the first manifold 346 closer to the cathode electrode 314, and the recesses 347a, 347b communicate with each other through the opening 348 (see FIGS. 23, 24, and 28).

An oxygen containing gas flow rectifying plate (cathode-side element member) 350 is fitted in the opening 348 in the first manifold plate 346. The oxygen containing gas flow rectifying plate 350 has a flat surface and an opposite surface having a passage 350a which is tortuous in the vertical direction. The holes 346d, 346h communicate with the passage 250a. The oxygen containing gas flow rectifying plate 350 is made of a dense material, specifically, corrosion-resistant, electrically conductive metal such as graphitized carbon, stainless steel, a nickel-base alloy such as Inconel (trademark), or the like, electrically conductive rubber, electrically conductive resin, or the like.

Figure 29:
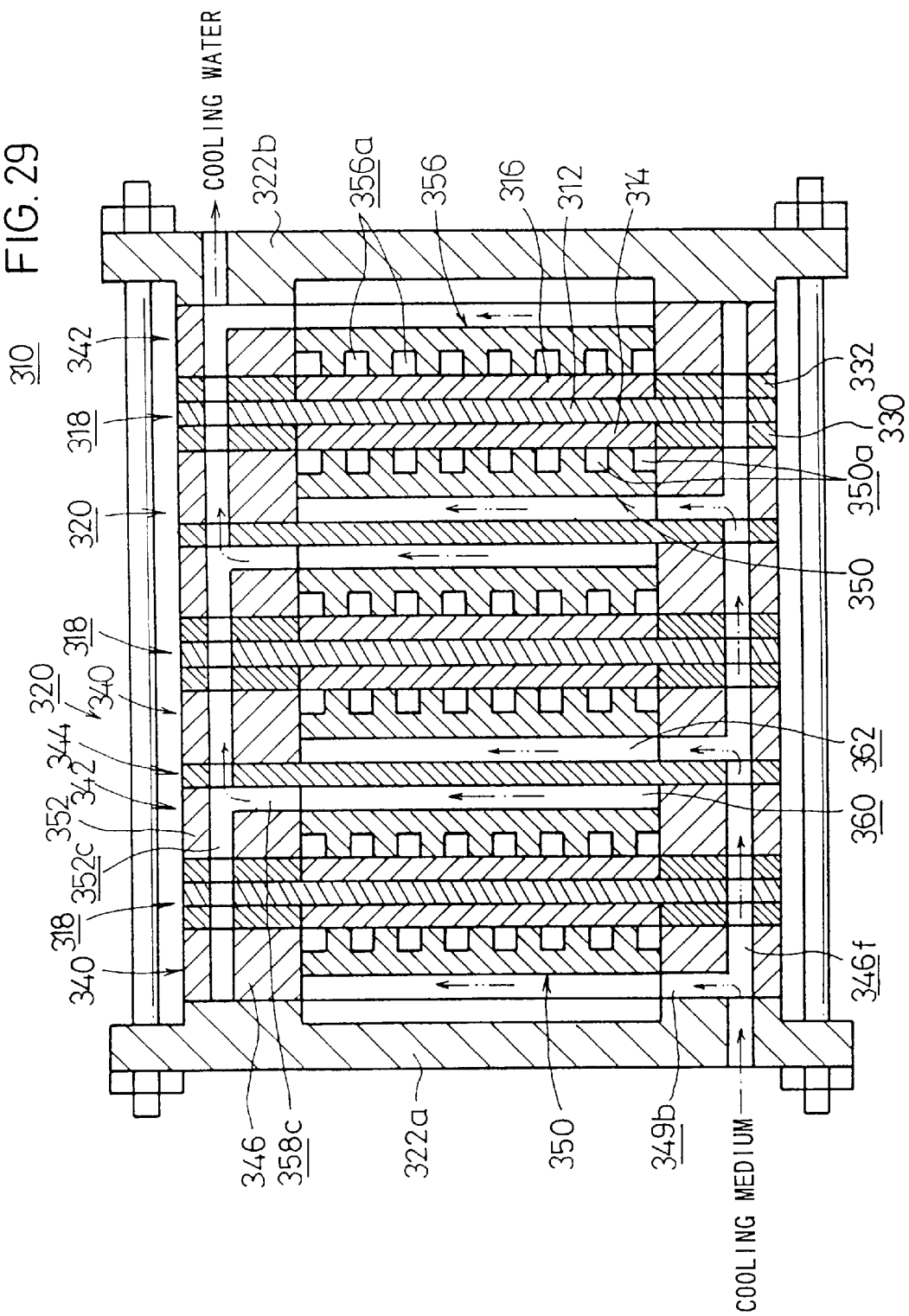
FIG. 29 is a cross-sectional view taken along line XXIX—XXIX of FIG. 22.
Figure 30:
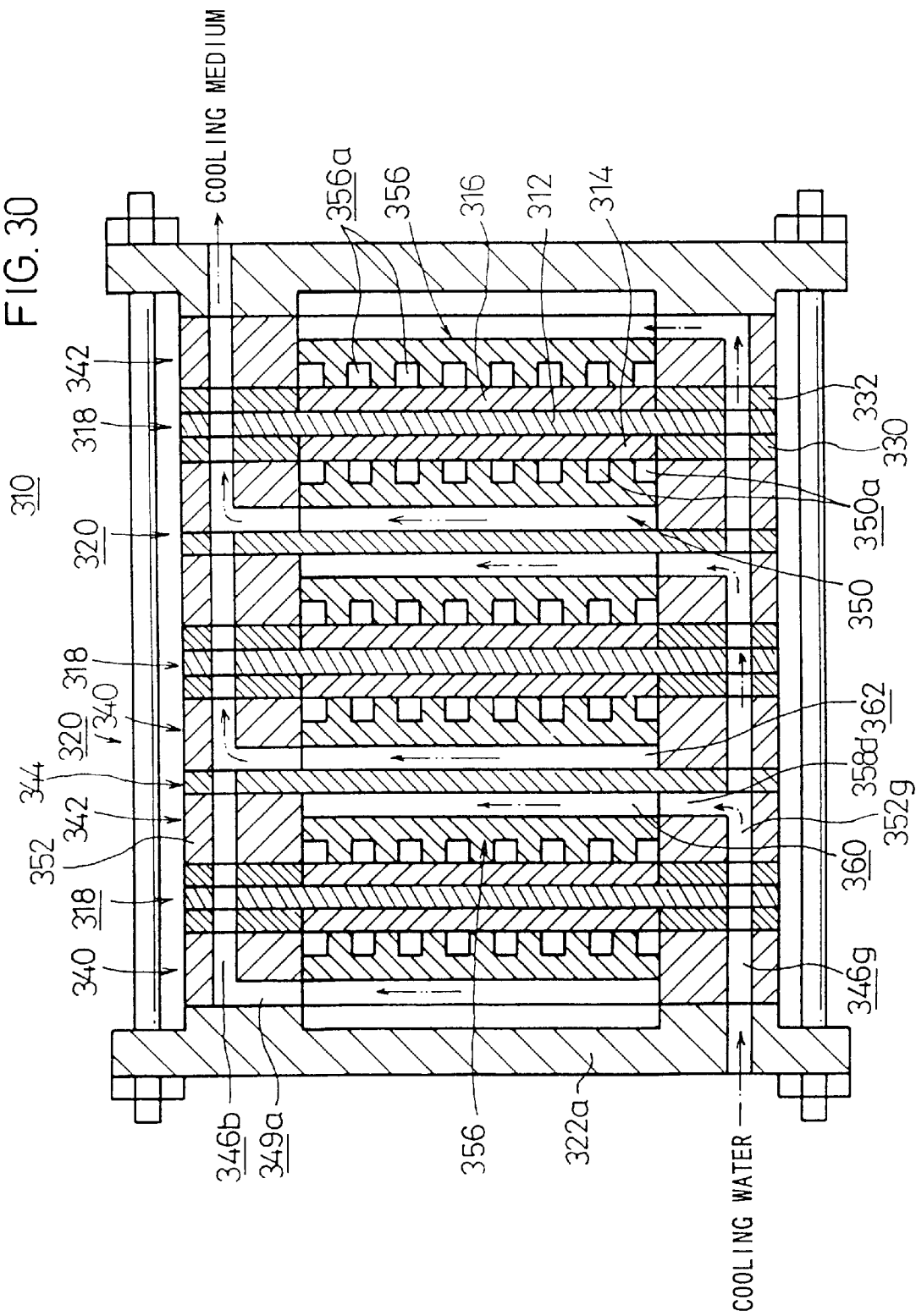
FIG. 30 is a cross-sectional view taken along line XXX—XXX of FIG. 22.
Figure 31:
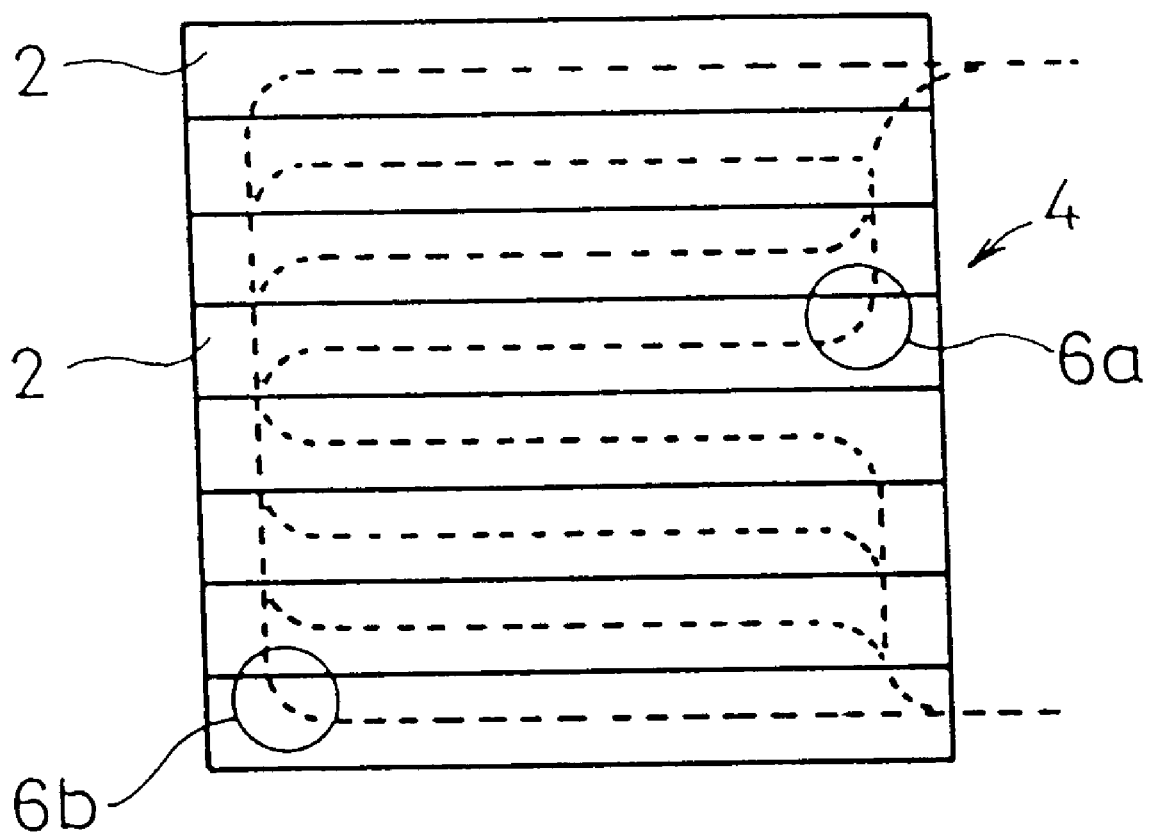
FIG. 31 is a schematic diagram showing a stack of conventional fuel cells.
Figure 32:
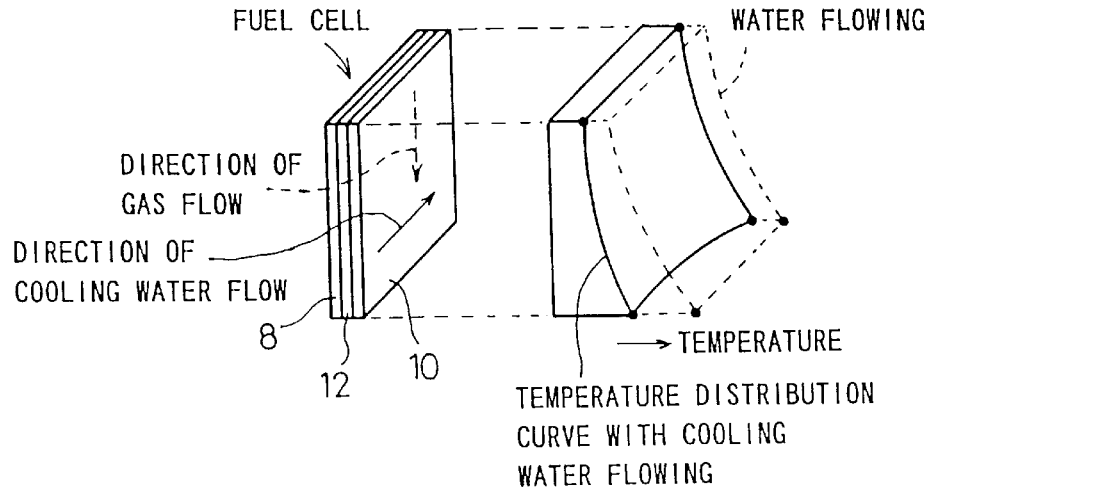
FIG. 32 is a perspective view showing the relationship between the layout of a conventional fuel cell and a temperature distribution thereof.
Figure 33:
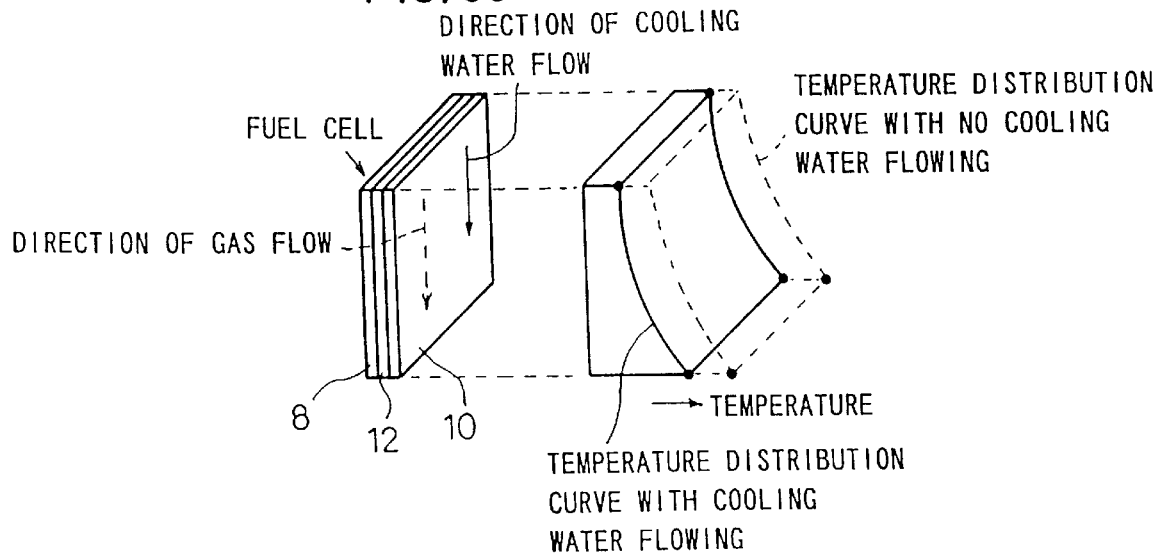
FIG. 33 is a perspective view showing the relationship between the layout of a conventional fuel cell and a temperature distribution thereof.

The holes 346b, 346f in the first manifold plates 346 communicate with each other through the opening 348 and recesses 349a, 349b that are defined therein closer to the second separator member 342 (see FIGS. 23, 29, and 30).

The second separator member 342 is identical in structure to the first separator member 340. The second separator member 342 comprises a second manifold plate 352 and a fuel gas flow rectifying plate (anode-side element member) 356 fitted in an opening 354 in the second manifold plate 352.

The second manifold plate 352 has a fuel gas introduction hole 352a, a cathode electrode cooling medium discharge hole 352b, a cooling water discharge hole 352c, and an oxygen containing gas introduction hole 352d which are defined in an upper portion thereof, and also has a fuel gas discharge hole 352e, a cathode electrode cooling medium introduction hole 352f, a cooling water introduction hole 352g, and an oxygen containing gas discharge hole 352h which are defined in a lower portion thereof. The holes 352a, 352e communicate with the opening 354 through respective recesses 358a, 358b (see FIGS. 23, 24, and 28), and the holes 352c, 352g communicate with the opening 354 through respective recesses 358c, 358d (see FIGS. 23, 29, and 30).

The fuel gas flow rectifying plate 356 has a flat surface and an opposite surface having a passage 356a which is tortuous in the vertical direction. The holes 346d, 346h communicate with the passage 250a. The fuel gas flow rectifying plate 356 is made of an electrically conductive, water-permeable material for supplying water (first cooling medium) supplied to the flat surface thereof to the anode electrode 316. Specifically, the fuel gas flow rectifying plate 356 is made of a porous material such as sintered porous carbon, electrically conductive sintered porous metal, electrically conductive porous rubber, electrically conductive porous resin, or the like, or a combination thereof. If the fuel gas flow rectifying plate 356 is made of sintered porous carbon, then the porosity thereof should preferably be equal to or smaller than 70% in order to prevent water from dropping, and the pore diameter should preferably be equal to or smaller than 40 μm.

The fuel gas flow rectifying plate 356 is preferably made of a porous material which is made water-repellent for increased durability. Specifically, the fuel gas flow rectifying plate 356 is made water-repellent by being immersed in a dispersed solution of PTFE (polytetrafluoroethylene) adjusted to a given concentration, then dried at room temperature, and baked at a temperature ranging from 300 to 350° C.

The separating plate 344 is made of corrosion-resistant, electrically conductive metal such as dense electrically conductive graphitized carbon, stainless steel, a nickel-base alloy, or the like, electrically conductive rubber, electrically conductive resin, or a combination thereof. The separating plate 344 has a fuel gas introduction hole 344a, a cathode electrode cooling medium discharge hole 344b, a cooling water discharge hole 344c, and an oxygen containing gas introduction hole 344d which are defined in an upper portion thereof, and also has a fuel gas discharge hole 344e, a cathode electrode cooling medium introduction hole 344f, a cooling medium introduction hole 344g, and an oxygen containing gas discharge hole 344h which are defined in a lower portion thereof.

As shown in FIG. 24, the separator 320 has a first cooling passage 360 for introducing cooling water to cool the anode electrode 316 between the fuel gas flow rectifying plate 356 and the separating plate 344, and a second cooling passage 362 for introducing a second cooling medium to cool the cathode electrode 314 between the oxygen containing gas flow rectifying plate 350 and the separating plate 344.

The first and second cooling passages 360, 362 are independent of each other, and water is supplied as the first cooling medium to the first cooling passage 360. The second cooling passage 362 is supplied with the second cooling medium which is made of at least one substance having a boiling point equal to or lower than the operating temperature of the fuel cell 310, the substance failing to react with other substances to be combined therewith or with the oxygen containing gas flow rectifying plate 350 and the separating plate 344.

Specifically, the second cooling medium may be made of an inorganic compound such as water (100° C.), ammonia (−33.43° C.), carbon dioxide (−78.5° C.), argon (−185.869° C.), or nitrogen (−195.8° C.), or an organic compound such as an alcohol such as methanol (64.51° C.), ethanol (78.3° C.), isopropanol (82.33° C.), or the like, an aldehyde or ketone such as acetaldehyde (20.4° C.), acetone (56.12° C.), ethyl methyl ketone (79.59° C.), formaldehyde (−19.1° C.), or the like, an ether such as ethyl propyl ether (63.86° C.), ethyl methyl ether (7.35° C.), diethyl ether (34.55° C.), dimethyl ether (−24.84° C.), diisopropyl ether (68.47° C.), or the like, a saturated hydrocarbon such as methane (−161.49° C.), ethane (−88.63° C.), propane (−42.07° C.), butane (−0.5° C.), pentane (36.07° C.), isopentane (27.85° C.), hexane (68.74° C.), isohexane (60.27° C.), or the like, an ester such as methyl formate (31.76° C.), ethyl formate (57° C.), ethyl acetate (77.17° C.), vinyl acetate (72.92° C.), methyl acetate (57° C.), or the like, or a cyclic compound such as cyclobutane (12.51° C.), cyclopropane (−32.87° C.), cyclohexane (80.74° C.), cyclopentane (49.26° C.), hexafluorobenzene (80.26° C.), perfluorocyclohexane (52.52° C.), or the like. The numerical values in the parentheses indicate boiling points of the substances under normal pressure.

Figure 25:
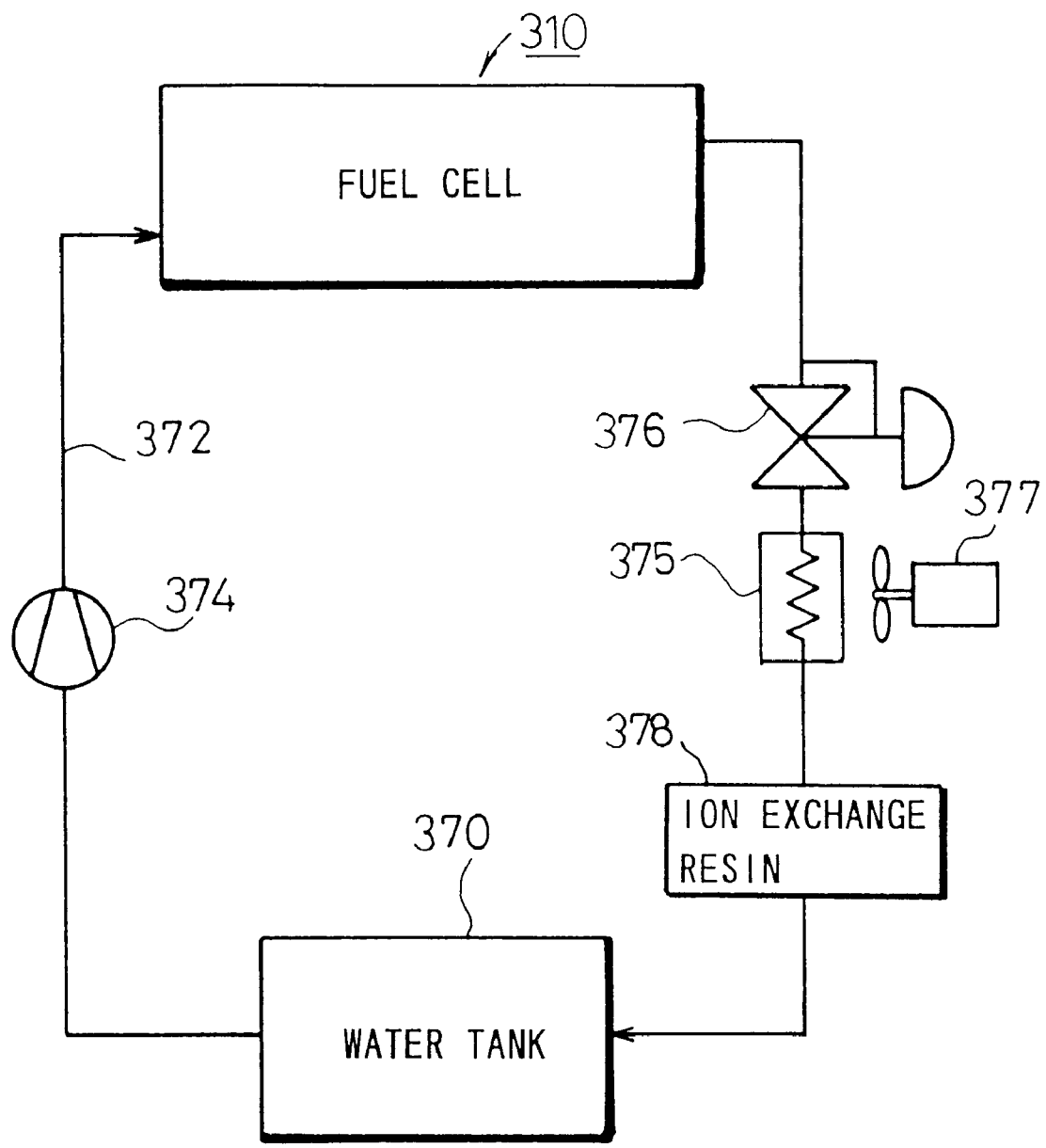
FIG. 25 is a schematic diagram of a supply means for supplying a first cooling medium.

FIG. 25 shows a water supply structure for supplying water to the first cooling passage 360. The water supply structure has a water tank 370 which communicates with the fuel cell 310 through a circulation passage 372. To the circulation passage 372, there is connected a water supply circulation pump 374 for supplying water from the water tank 370 to the fuel cell 310. The fuel cell 310 has a water outlet connected to a back pressure valve 376, a radiator 375 combined with a cooling fan 377, and an ion exchange resin 378.

Figure 26:
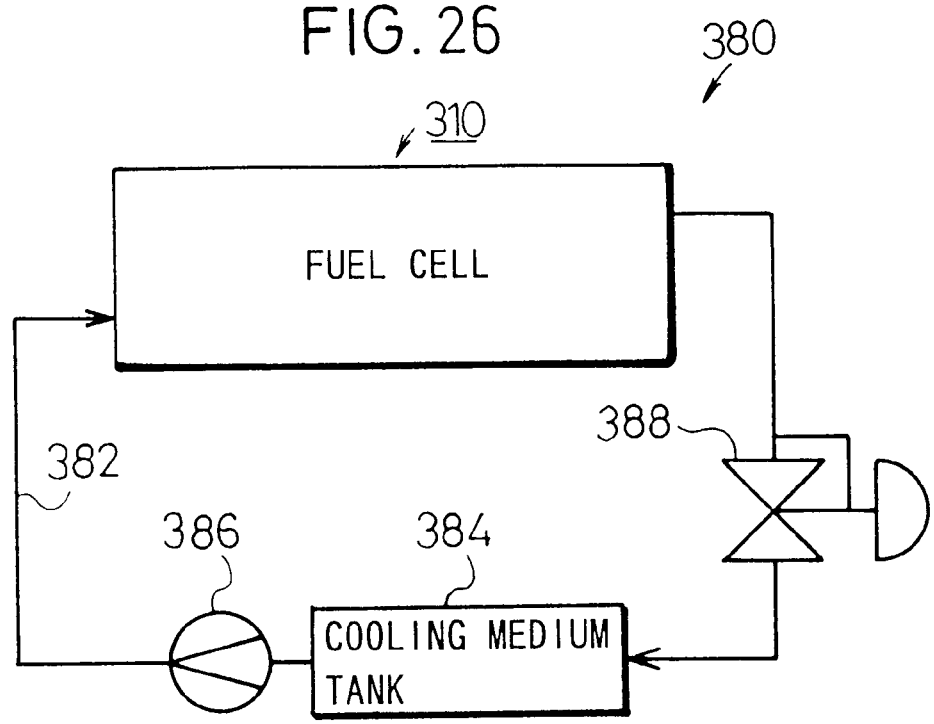
FIG. 26 is a schematic diagram of a pressure control means for controlling the pressure of a second cooling medium.
Figure 27:
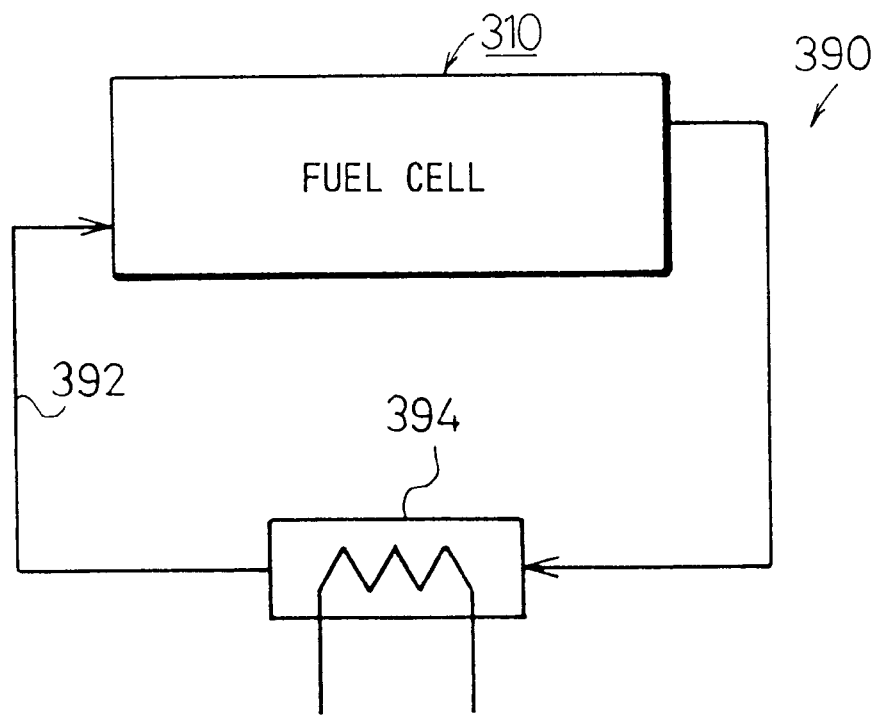
FIG. 27 is a schematic diagram of another pressure control means for controlling the pressure of the second cooling medium.

A pressure control means 380 shown in FIG. 26 and a pressure control means 390 shown in FIG. 27 are selectively provided for controlling a tightening pressure applied by the second cooling medium that is supplied to the second cooling passage 362. The pressure control means 380 is used when the boiling point of the second cooling medium introduced into the second cooling passage 362 is close the operating temperature of the fuel cell 310 and the vapor pressure of the second cooling medium is insufficient. The pressure control means 380 comprises a cooling medium tank 384 communicating with the fuel cell 310 through a circulation passage 382, and a booster pump 386 and a back pressure valve 388 which are connected to the circulation passage 382.

The pressure control means 390 is used when the boiling point of the second cooling medium introduced into the second cooling passage 362 is lower than the operating temperature of the fuel cell 310 and the vapor pressure of the second cooling medium is sufficient. The pressure control means 390 comprises a temperature regulator 394 connected to the circulation passage 382 for heating or cooling the cooling medium.

Operation of the fuel cell 310 thus constructed will be described below.

When a fuel gas (hydrogen containing gas) is supplied to the fuel cell 310, the fuel gas flows through the hole 346a in the first manifold plate 346 of the first separator member 340 and the holes 330a, 312a, 332a in the fuel cell structure 318 into the hole 352a in the second manifold plate 352 of the second separator member 342. The fuel gas is supplied from the hole 352a and the recess 358a through the passage 356a of the fuel gas flow rectifying plate 356 to the anode electrode 316, and then is discharged into the recess 358b.

Figure 28:
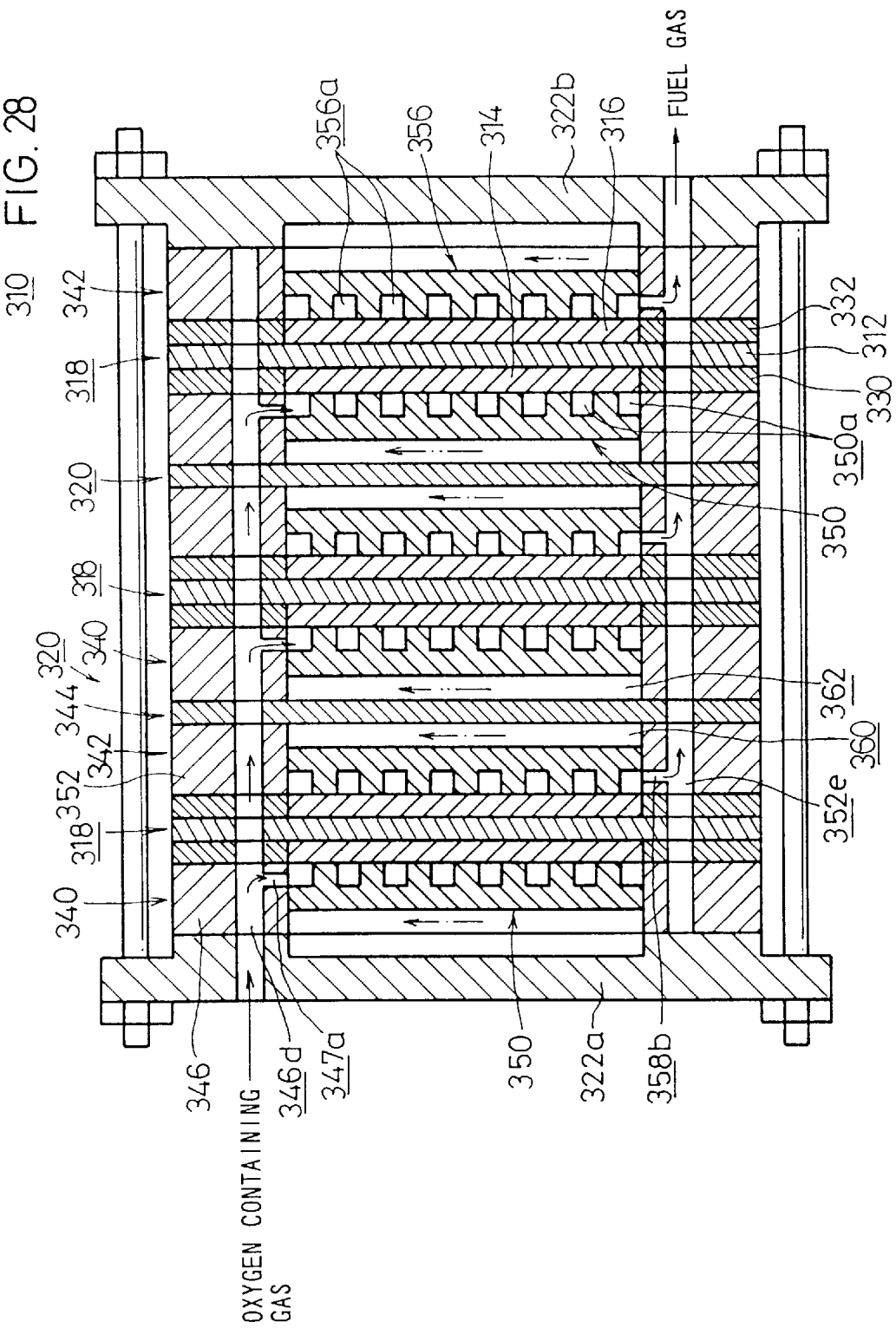
FIG. 28 is a cross-sectional view taken along line XXVIII—XXVIII of FIG. 22.

As shown in FIG. 28, an oxygen containing gas is supplied into the hole 346d in the first manifold plate 346, introduced from the hole 346d and the recess 347a into the passage 350a of the oxygen containing gas flow rectifying plate 350, and supplied to the cathode electrode 314 of the fuel cell structure 318. An unused oxide gas is discharged out through the hole 346h in the first manifold 346, as shown in FIG. 24. An unused oxide gas is discharged out through the hole 352e in the second manifold plate 352, as shown in FIG. 28.

As shown in FIG. 25, water as the first cooling medium is supplied from the water tank 370 through the circulation passage 372 into the fuel cell 310 by the pump 374. As shown in FIG. 30, the water flows through the hole 346g in the first separator member 340 and the holes 330g, 312g, 332g in the fuel cell structure 318 into the hole 352g in the second separator member 342, is introduced from the recess 358d communicating with the hole 352g into the first cooling passage 360 between the separating plate 344 and the fuel gas flow rectifying plate 356, and flows upwardly through the first cooling passage 360.

Since the fuel gas flow rectifying plate 356 is made of a water-permeable material (porous material), the water introduced into the first cooling passage 360 passes through the fuel gas flow rectifying plate 356 to directly humidify the fuel gas supplied to the passage 356a and the anode electrode 316.

The second cooling medium is supplied to the fuel cell 310 by the pressure control means 380 or the pressure control means 390. As shown in FIG. 29, the second cooling medium is supplied into the hole 346f in the first separator member 340, and introduced from the recess 349b communicating with the hole 346f upwardly into the second cooling passage 362 in the separator 320.

The oxygen containing gas flow rectifying plate 350 which defines the second cooling passage 362 is made of a dense material, and the second cooling passage 362 and the first cooling passage 360 are separated fully independently from each other by the separating plate 344. Therefore, under the vapor pressure or the pressure itself of the second cooling medium introduced into the second cooling passage 362, the oxygen containing gas flow rectifying plate 350 is pressed toward the cathode electrode 314, developing desired tightening forces acting in the fuel cell structure 318. The contact resistance in the fuel cell structure 318 is thus reduced, reliably preventing the voltage between the cell terminals from dropping.

The pressing forces can freely be set to a desired level at the operating temperature by introducing a plurality of cooling mediums having different boiling points and adjusting their proportions and amounts.

In the fifth embodiment, as described above, the separator 320 has the first and second separator members 340, 342 and the separating plate 344 interposed therebetween, and the first and second cooling passages 360, 362 are defined independently of each other with the separating plate 344 interposed therebetween. Consequently, the first and second cooling passages 360, 362 are selectively supplied with the first and second cooling mediums corresponding to the anode electrode 316 and the cathode electrode 314.

Particularly, the first cooling passage 360 defined by the fuel gas flow rectifying plate 356 which is made of a water-permeable material is supplied with water as the first cooling medium, and the second cooling passage 362 defined by the oxygen containing gas flow rectifying plate 350 which is made of a dense material is supplied with the second cooling medium that can generate a desired pressure. Therefore, the water introduced into the first cooling passage 360 directly humidifies the fuel gas and the anode electrode 316, and the second cooling medium introduced into the second cooling passage 326 imparts desired tightening forces to the fuel cell structure 318.

Therefore, the separator 320 has a function to supply the fuel gas and the oxygen containing gas separately from each other, and a function to remove the heat generated by the internal resistance of the fuel cell structure 318, and also a function to directly humidify the anode electrode 316 supplied with the fuel gas, and a function to press the cathode electrode 314 to impart desired tightening forces. The separator 320 is thus of a simple structure, has multiple functions, and can make the fuel cell 310 small and light as a whole.

INDUSTRIAL APPLICABILITY

According to the present invention, in a fuel cell comprising a horizontal stack of fuel cells, a fuel gas and an oxygen containing gas flow downwardly in the vertical direction, i.e., the direction of gravity, and a cooling medium for cooling the gases flows in a direction opposite to the direction of gravity, i.e., opposite to the flow of the gases, so that the fuel cells are cooled by the cooling medium which has a sufficient cooling capability at the gas outlet of the fuel cells, and the cooling capability is reduced at the gas inlet on upper portions of the fuel cells. As a result, the fuel cells have a reduced temperature distribution between the gas inlet and outlet, for thereby operating the fuel cells under stable conditions and increasing the service life of the fuel cells.

According to the present invention, furthermore, the fuel cell has an anode-side element member held against an anode electrode and a cathode-side element member held against a cathode electrode, with a cooling medium passage defined directly between the anode-side element member and the cathode-side element member. Thus, the number of parts of a separator is reduced with ease. The surfaces of the anode-side element member and the cathode-side element member which define the cooling medium passage have increased contact area regions. Optimum cooling efficiencies for the anode and cathode electrodes can be established simply by changing the shape, etc. of the increased contact area regions.

According to the present invention, furthermore, the fuel cell has a first gas passage for passing an oxygen containing gas and/or a temperature regulating medium passage having the same structure as a second gas passage for passing a fuel gas, and the oxygen containing gas and a temperature regulating medium flow in opposite directions to each other. Therefore, the oxygen containing gas flowing through the first gas passage and a cooling medium flowing through the temperature regulating medium passage flow in opposite directions to each other, so that the efficiency of heat exchange between the oxygen containing gas and the cooling medium is increased for uniformizing the temperature of the electric generation section. Similarly, the temperature of the electric generation section can be uniformized by the fuel gas flowing through the second gas passage and the cooling medium flowing through the temperature regulating medium passage.

According to the present invention, moreover, first and second cooling passages defined independently in a separator can selectively be supplied with desired first and second cooling mediums depending on the anode electrode and the cathode electrode. With this arrangement, various advantages can be achieved, e.g., the heat of the fuel cell structure can be removed, the fuel gas can be humidified, and tightening forces can be imparted, and the fuel cell can easily be reduced in size and weight through a simple structure.

I claim:

1. A method of controlling a fuel cell having a horizontal stack of fuel cells each having an anode electrode and a cathode electrode which sandwich an electrolyte membrane and which are sandwiched by separators, comprising the steps of supplying a fuel gas and an oxygen containing gas in a direction of gravity to the anode electrode and the cathode electrode, and supplying a cooling medium into said separators in a direction opposite to the direction in which the fuel gas and the oxygen containing gas flow, wherein the cooling medium minimizes the temperature distribution within the fuel cell, thereby improving the operation of the fuel cell.

2. A method according to claim 1, wherein said cooling medium supplied to cool the anode electrode comprises water for humidifying the electrolyte membrane said fuel cells by water migrating through the anode electrode, whereby the humidification process improves the operation of the fuel cell.

3. A fuel cell comprising:
   a fuel cell structure having an anode electrode and a cathode electrode which face each other with an electrolyte membrane interposed therebetween; and
   separators sandwiching said fuel cell structure;
   each of said separators having:
      an anode-side element member held against said anode electrode;
      a cathode-side element member held against said cathode electrode; and
      a cooling medium passage defined between said anode-side element member and said cathode-side element member;
   said anode-side element member and said cathode-side element member having increased contact area regions on respective surfaces which define said cooling medium passage, for providing an increased area of contact with a cooling medium flowing in said cooling medium passage.

4. A fuel cell according to claim 3, wherein said increased contact area regions comprise concave regions or convex regions.

5. A fuel cell according to claim 3, wherein said increased contact area regions comprise concave regions and convex regions.

6. A fuel cell according to claim 3, wherein said increased contact area regions of the anode-side element member and said increased contact area regions of the cathode-side element member have different areas of contact with the cooling medium.

7. A fuel cell according to claim 3, wherein said increased contact area regions of the anode-side element member and said increased contact area regions of the cathode-side element member are disposed for contact with the cooling medium only.

8. A fuel cell according to claim 3, wherein said anode-side element member has a fuel gas flow rectifying plate, said fuel gas flow rectifying plate having on a surface thereof a plurality of horizontal ridges extending parallel to each other in staggering relationship and jointly defining a vertically tortuous fuel gas passage and also having on an opposite surface a plurality of heat exchange fins serving as said increased contact area regions.

9. A fuel cell according to claim 3, wherein said cathode-side element member has an oxygen containing gas flow rectifying plate, said oxygen containing gas flow rectifying plate having on a surface thereof a plurality of horizontal ridges extending parallel to each other in staggering relationship and jointly defining a vertically tortuous oxygen containing gas passage and also having on an opposite surface a plurality of heat exchange fins serving as said increased contact area regions.

10. A fuel cell according to claim 3, wherein said anode-side element member or said cathode-side element member is made of a corrosion-resistant, electrically conductive metal selected from the group of carbon, stainless steel, a nickel-based alloy, electrically conductive rubber, electrically conductive resin, or a combination thereof.

11. A fuel cell according to claim 3, wherein said cooling medium passage has a cooling medium therein, said cooling medium being selected from the group of water, methanol, a mixed solution of water and methanol, an operating gas for fuel cells, or a substance having a boiling point equal to or lower than the operating temperature of the fuel cell.

12. A fuel cell comprising:
   a fuel cell structure having an anode electrode and a cathode electrode which face each other with an electrolyte membrane interposed therebetween; and
   separators sandwiching said fuel cell structure;
   each of said separators having:
      first and second gas passages connected respectively with supply passages positioned nfor supplying an oxygen containing gas and a fuel gas to said first and second gas passages such that said oxygen containing gas and said fuel gas flow through said first and second gas passages parallel to each other in a direction of gravity to said cathode electrode and said anode electrode, respectively; and
      temperature regulating medium passages defined in said first gas passage or said second gas passage by a partition and being identical in structure to said first gas passage or said second gas passage, said temperature regulating medium passages being connected with a supply passage positioned for supplying a temperature regulating medium to said temperature regulating medium passages such that said temperature regulating medium flows through said temperature regulating medium passages in a direction opposite to the direction of gravity;
   the arrangement being such that gas flows through said first or second gas passage sand said temperature regulating medium flows through said temperature regulating medium passages in opposite directions to each other.

13. A fuel cell according to claim 12, wherein said temperature regulating medium passages have a temperature regulating medium therein, said temperature regulating medium being selected from the group of water, methanol, or a mixed solution of water and methanol.

14. A fuel cell according to claim 12, wherein said first gas passage and said second gas passage have a passage structure for passing the oxygen containing gas and the fuel gas parallel to each other tortuously in the direction of gravity.

15. A fuel cell comprising:
   a fuel cell structure having an anode electrode and a cathode electrode which face each other with an electrolyte membrane interposed therebetween; and
   separators sandwiching said fuel cell structure;
   each of said separators having:
      first and second gas passages connected respectively with supply passages positioned for supplying an oxygen containing gas and a fuel gas to said first and second gas passages such that said oxygen containing gas and said fuel gas flow through said first and second gas passages parallel to each other in a direction of gravity to said cathode electrode and said anode electrode, respectively; and
      temperature regulating medium passages defined in said first gas passage or said second gas passage by a partition and being identical in structure to said first gas passage or said second gas passage, said temperature regulating medium passages being connected with a supply passage positioned for supplying a temperature regulating medium to said temperature regulating medium passages such that said temperature regulating medium flows through said temperature regulating medium passages in a direction opposite to the direction of gravity;

the arrangement being such that gases flow through said first and second gas passages and said temperature regulating medium flows through said temperature regulating medium passages in opposite directions to each other.

16. A fuel cell according to claim 15, wherein a cross-sectional area of said first gas passage for supplying said oxygen containing gas and a cross-sectional area of said temperature regulating medium passage defined in said first gas passage by said partition are greater than a cross-sectional area of said second gas passage for supplying said fuel gas and a cross-sectional area of said temperature regulating medium passage defined in said second gas passage by said partition.

17. A fuel cell according to claim 16, wherein said temperature regulating medium passages have a temperature regulating medium therein, said temperature regulating medium being selected from the group of water, methanol, or a mixed solution of water and methanol.

18. A fuel cell according to claim 16, wherein said first gas passage and said second gas passage have a passage structure for passing the oxygen containing gas and the fuel gas parallel to each other tortuously in the direction of gravity.

19. A fuel cell comprising:

a fuel cell structure having an anode electrode and a cathode electrode which face each other with an electrolyte membrane interposed therebetween; and separators sandwiching said fuel cell structure;

each of said separators having:

a first cooling passage for being supplied with a first cooling medium to cooling said anode electrode; and a second cooling passage for being supplied with a second cooling medium to cooling said cathode electrode, said first cooling passage and said second cooling passage being independent of each other.

20. A fuel cell according to claim 19, wherein each of said separators has an anode-side element member held in contact with said anode electrode, said anode-side element member being made of an electrically conductive, water-permeable material for supplying water, supplied as said first cooling medium to said first cooling passage, to said anode electrode and a fuel gas.

21. A fuel cell according to claim 20, wherein said anode-side element member is made of sintered porous carbon, electrically conductive sintered porous metal, electrically conductive porous rubber, electrically conductive porous resin, or a combination thereof.

22. A fuel cell according to claim 21, wherein said sintered porous carbon has a porosity of 70% or smaller and a pore diameter of 40 $\mu$m or smaller.

23. A fuel cell according to claim 21, wherein anode-side element member is made of a water-repellent porous material.

24. A fuel cell according to claim 19, wherein each of said separators has a cathode-side element member held in contact with said cathode electrode, said cathode-side element member being made of a dense material for imparting a tightening force to said cathode electrode under the pressure of the second cooling medium supplied to said second cooling passage.

25. A fuel cell according to claim 24, wherein said cathode-side cathode-side element member is made of a corrosion-resistant, electrically conductive metal selected from the group of graphitized carbon, stainless steel, a nickel-based alloy, electrically conductive rubber, electrically conductive resin, or a combination thereof.

26. A fuel cell according to claim 19, wherein said second cooling medium is made of at least one substance having a boiling point equal to or lower than the operating temperature of the fuel cell, said substance failing to react with other substances to be combined therewith or with a member held against said substance.

27. A fuel cell according to claim 19, further comprising pressure control means for controlling the pressure of the second cooling medium supplied to said second cooling passage.

28. A fuel cell according to claim 27, wherein said pressure control means comprises a booster pump and a back pressure valve disposed outside of the fuel cell.

29. A fuel cell according to claim 27, wherein said pressure control means comprises a temperature regulator for controlling the temperature of said second cooling medium.

30. A fuel cell according to claim 19, wherein each of said separtors has a separating member for separating said first cooling passage and said second cooling passage from each other, said separating member being made of corrosion-resistant, electrically conductive metal selected from the group of dense, electrically conductive graphitized carbon, stainless steel, a nickel-based alloy, electrically conductive rubber, electrically conductive resin, or a combination thereof.

* * * * *